(12) United States Patent
Martin

(10) Patent No.: US 10,974,666 B2
(45) Date of Patent: *Apr. 13, 2021

(54) ADAPTER PLATE FOR MOUNTING A LICENSE PLATE ONTO A VEHICLE

(71) Applicant: Darren Martin, Surrey (CA)

(72) Inventor: Darren Martin, Surrey (CA)

(*) Notice: Subject to any disclaimer, the term of this patent is extended or adjusted under 35 U.S.C. 154(b) by 104 days.

This patent is subject to a terminal disclaimer.

(21) Appl. No.: 15/905,147

(22) Filed: Feb. 26, 2018

(65) Prior Publication Data

US 2018/0186312 A1 Jul. 5, 2018

Related U.S. Application Data

(63) Continuation-in-part of application No. 14/569,481, filed on Dec. 12, 2014, now Pat. No. 9,669,776, and a continuation-in-part of application No. 15/098,000, filed on Apr. 13, 2016, now Pat. No. 9,902,344.

(51) Int. Cl.
*B60R 13/10* (2006.01)
*G09F 7/18* (2006.01)

(52) U.S. Cl.
CPC ............ *B60R 13/105* (2013.01); *G09F 7/18* (2013.01); *G09F 2007/1895* (2013.01)

(58) Field of Classification Search
None
See application file for complete search history.

(56) References Cited

U.S. PATENT DOCUMENTS

| | | | |
|---|---|---|---|
| 1,154,847 A | 9/1915 | De Vore | |
| 1,575,950 A | 3/1926 | Thorn | |
| 1,692,469 A | 11/1928 | Rex | |
| 2,062,156 A | 11/1936 | Zerbst | |
| 2,266,715 A | 12/1941 | Parrott | |
| 2,305,750 A | 12/1942 | Vokaty | |
| 2,406,286 A | 8/1946 | Gantnier | |
| 2,518,669 A | 8/1950 | Dickson | |
| 2,591,196 A * | 4/1952 | Post | B60R 13/105 40/211 |
| 2,661,558 A | 12/1953 | Salisbury | |
| 2,710,475 A | 6/1955 | Salzman | |
| 3,439,440 A | 4/1969 | Klekamp | |

(Continued)

FOREIGN PATENT DOCUMENTS

| | | |
|---|---|---|
| DE | 102007047674 | 4/2009 |
| EP | 0739775 | 10/1996 |

(Continued)

OTHER PUBLICATIONS

"PEMSERT(R) Self clinching Flush Fasteners", pp. F4-714 and F4-2, PennEngineering, Danboro, PA, USA, 2014.

*Primary Examiner* — Kristina N Junge

(74) *Attorney, Agent, or Firm* — Nicholas Garner; Oyen Wiggs Green & Mutala LLP

(57) ABSTRACT

There is provided an adapter plate assembly for mounting a license plate to a vehicle. The assembly includes an adapter plate with a backing portion shaped to couple with and inhibit bending of the license plate. The assembly includes a resilient member having a lower portion connectable with the adapter plate and an upper portion for coupling to the vehicle. The resilient member is configured to enable the license plate to move slightly forward and rearward.

20 Claims, 30 Drawing Sheets

(56) References Cited

U.S. PATENT DOCUMENTS

| | | | |
|---|---|---|---|
| 3,509,653 A | 5/1970 | Hummel | |
| D245,497 S | 8/1977 | Ritch | |
| 4,314,417 A | 2/1982 | Cain | |
| D285,784 S | 9/1986 | Langensiepen | |
| 4,730,404 A | 3/1988 | Utsch | |
| 4,796,841 A * | 1/1989 | Baker | F01N 13/1822 248/60 |
| 4,958,451 A | 9/1990 | Iwakura et al. | |
| D311,167 S | 10/1990 | Ching-Hwei | |
| 5,027,537 A | 7/1991 | Freeman | |
| 5,073,842 A | 12/1991 | Monroe | |
| 5,255,767 A | 10/1993 | Norwood | |
| 5,662,302 A | 9/1997 | Berry, Jr. | |
| 5,692,327 A | 12/1997 | Wynne et al. | |
| 5,878,516 A | 3/1999 | Amirian | |
| 6,592,137 B2 | 7/2003 | Grove | |
| 6,757,998 B1 | 7/2004 | Lucatorto | |
| 6,957,820 B1 | 10/2005 | Stefani | |
| 7,073,618 B1 | 7/2006 | Song | |
| D528,953 S | 9/2006 | Kellermann | |
| D533,828 S | 12/2006 | Reimitz | |
| D534,110 S | 12/2006 | Kellermann | |
| 7,200,961 B2 | 4/2007 | Yeo | |
| D599,726 S | 9/2009 | Pacleb | |
| 7,883,064 B2 | 2/2011 | Luft et al. | |
| D633,837 S | 3/2011 | Murray | |
| 8,245,996 B1 | 8/2012 | Ciabaszwewski | |
| 8,695,243 B1 | 4/2014 | Aldasem | |
| 2003/0182829 A1 | 10/2003 | Simonazzi | |
| 2004/0079007 A1 | 4/2004 | Hashim et al. | |
| 2004/0079009 A1 | 4/2004 | Arrua | |
| 2004/0170024 A1 | 9/2004 | Sheu et al. | |
| 2005/0087575 A1 | 4/2005 | Samsel et al. | |
| 2006/0156595 A1 | 7/2006 | Kasak | |
| 2007/0101624 A1 | 5/2007 | Records | |
| 2008/0054677 A1 | 3/2008 | McGee | |
| 2010/0101123 A1 | 4/2010 | Pacleb | |
| 2011/0247248 A1 | 10/2011 | Dowd | |
| 2012/0248283 A1 | 10/2012 | Chen | |
| 2014/0133935 A1 | 5/2014 | MacNeil et al. | |
| 2014/0237870 A1 | 8/2014 | Edismore | |
| 2014/0263923 A1 | 9/2014 | McKinney | |
| 2014/0331530 A1 | 11/2014 | Masanek, Jr. | |

FOREIGN PATENT DOCUMENTS

| | | |
|---|---|---|
| EP | 2064090 | 2/2010 |
| WO | WP2006/075897 A1 | 7/2006 |

* cited by examiner

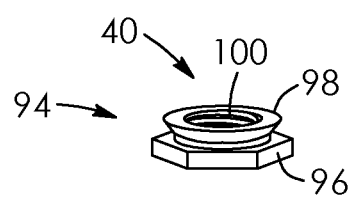
FIG. 7
(PRIOR ART)
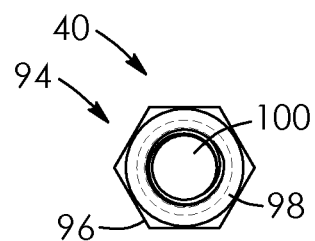
FIG. 8
(PRIOR ART)
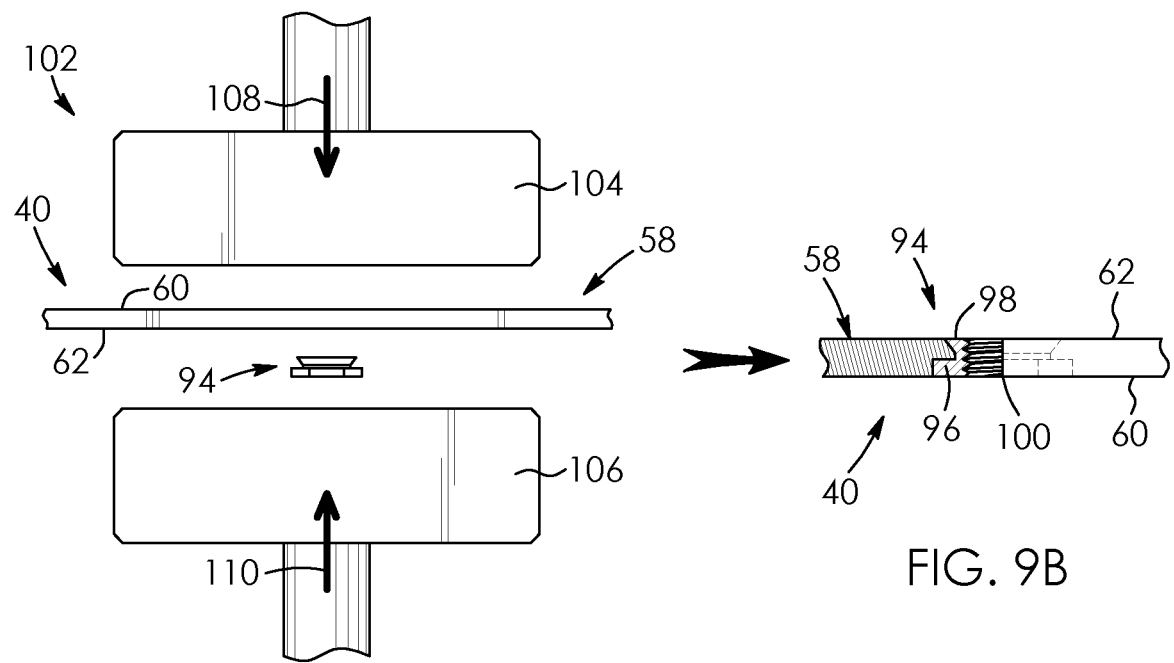
FIG. 9A
FIG. 9B

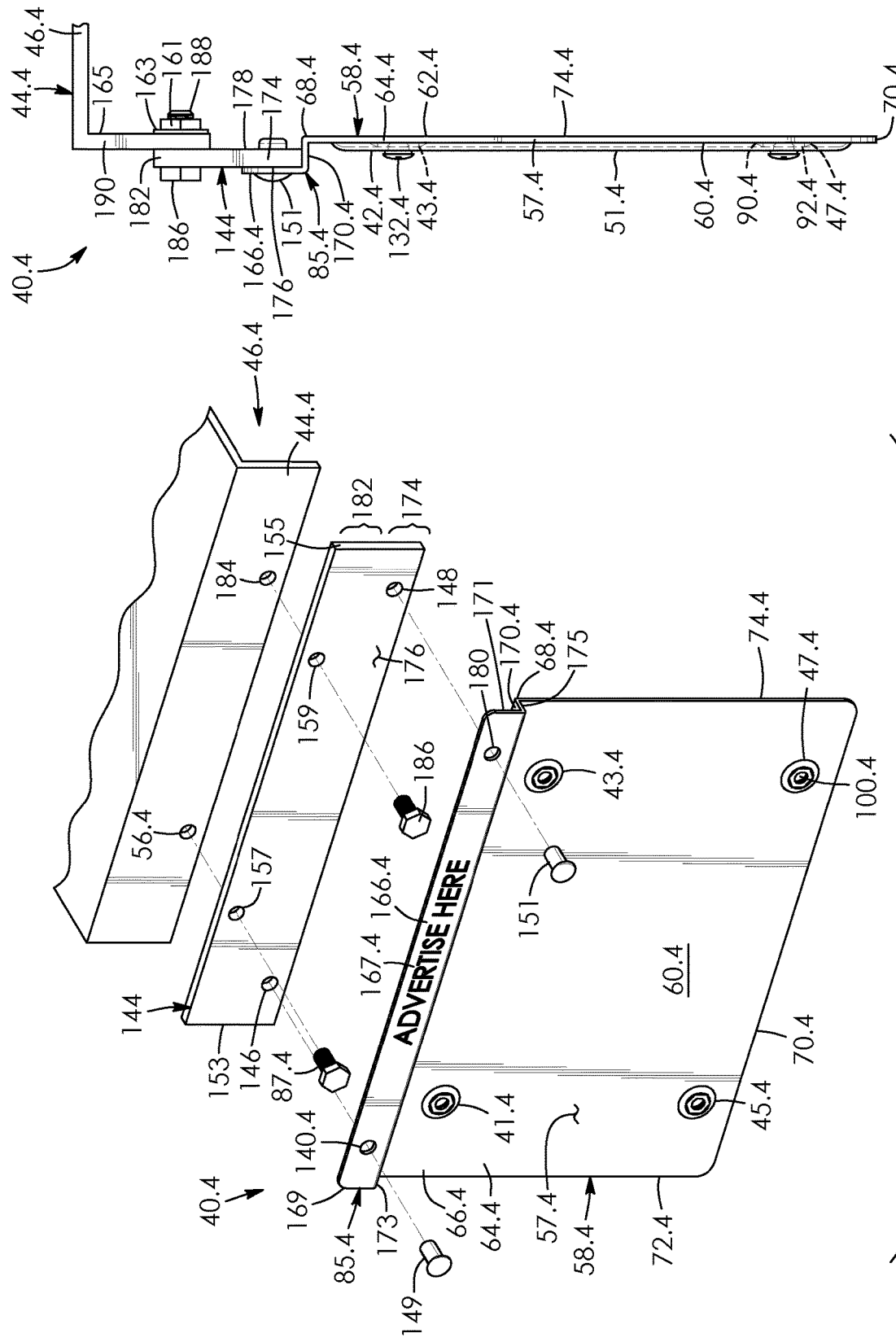

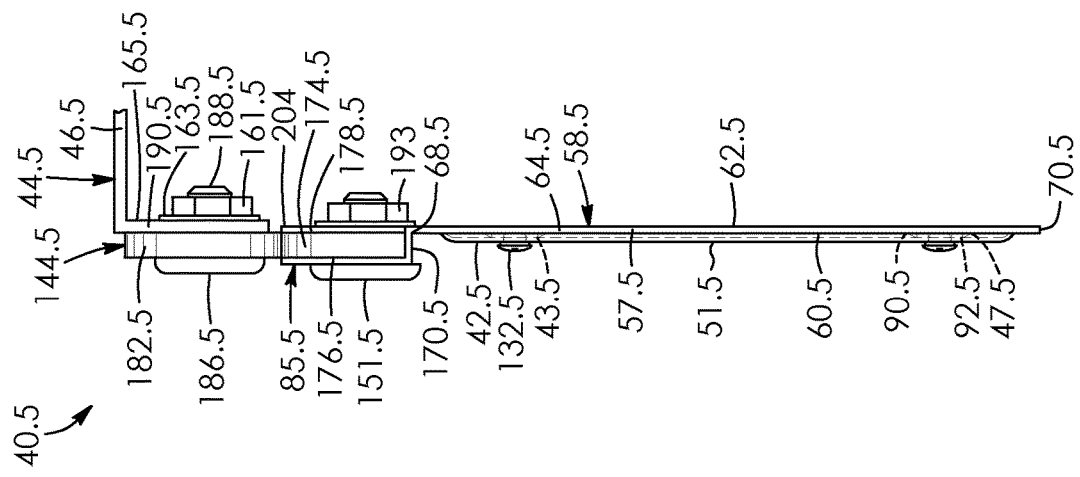
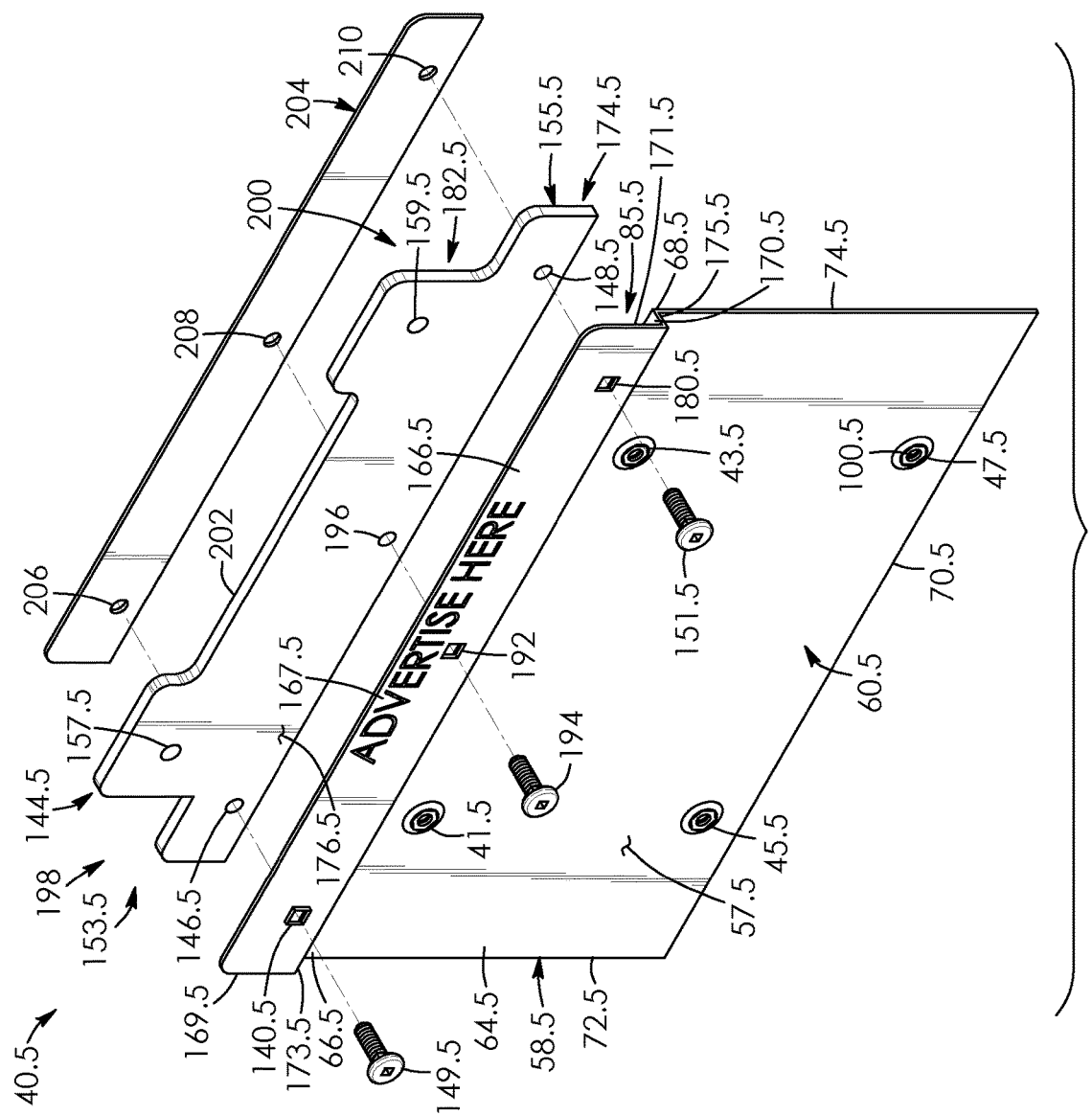
FIG. 35
FIG. 34

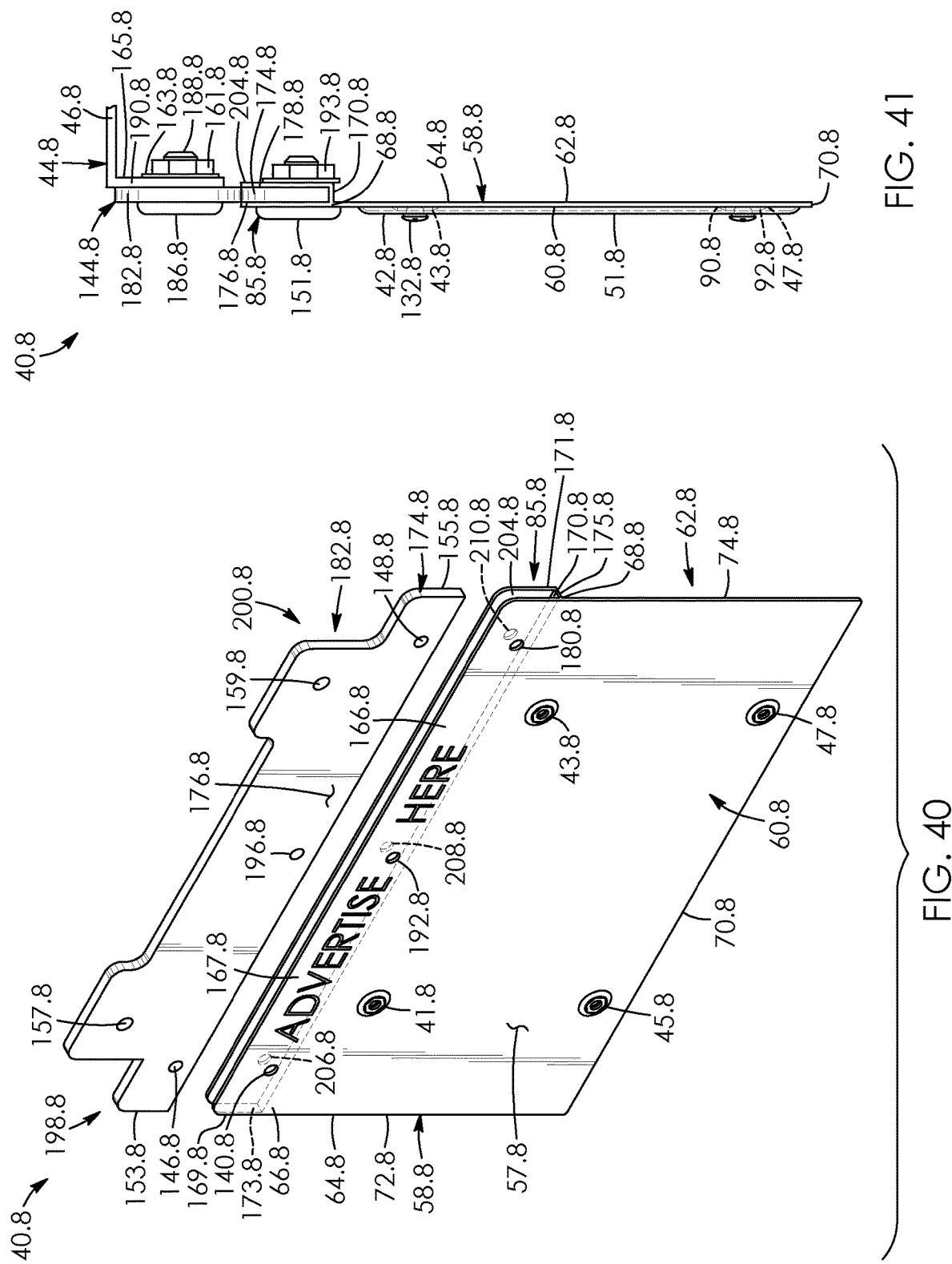

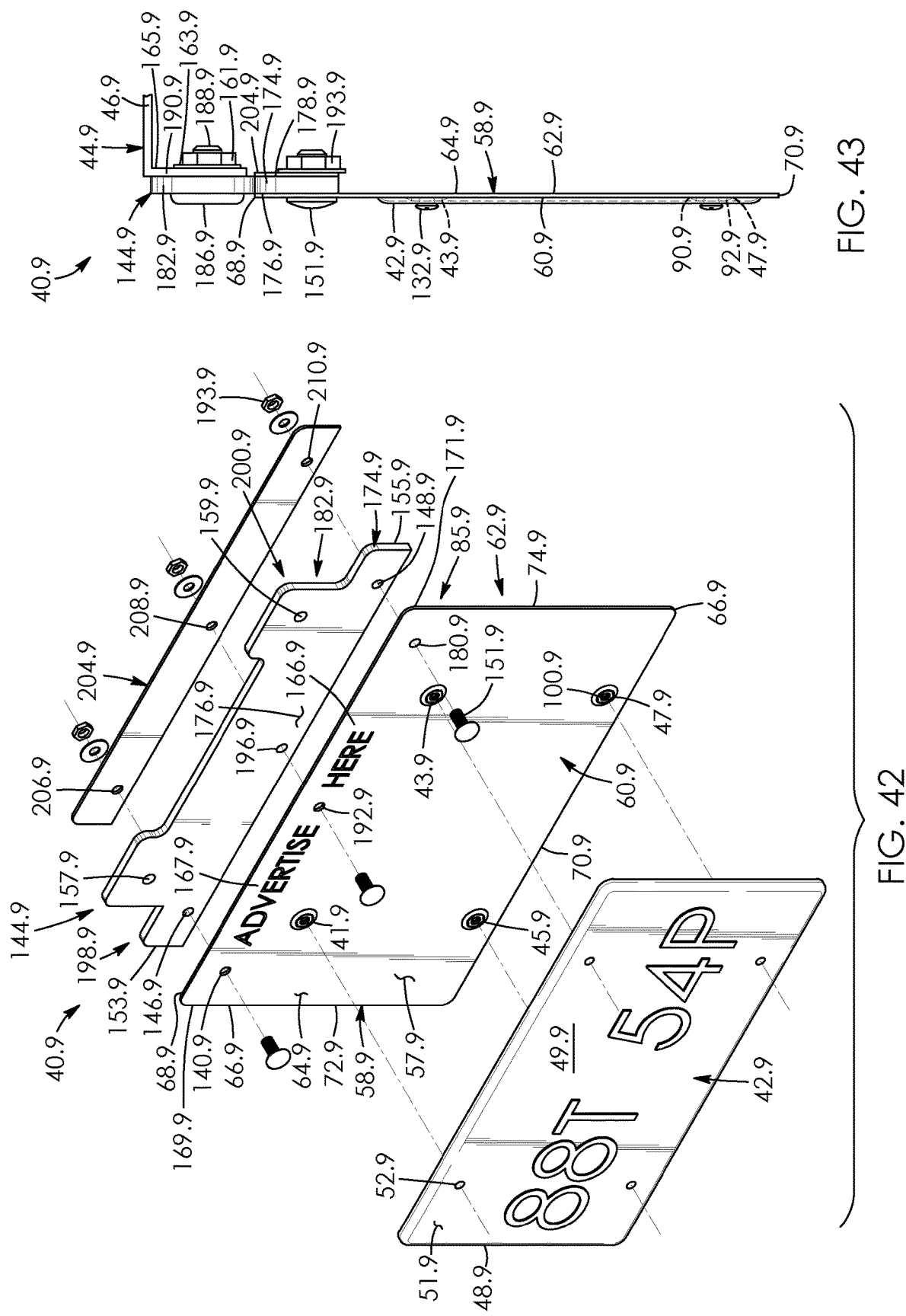

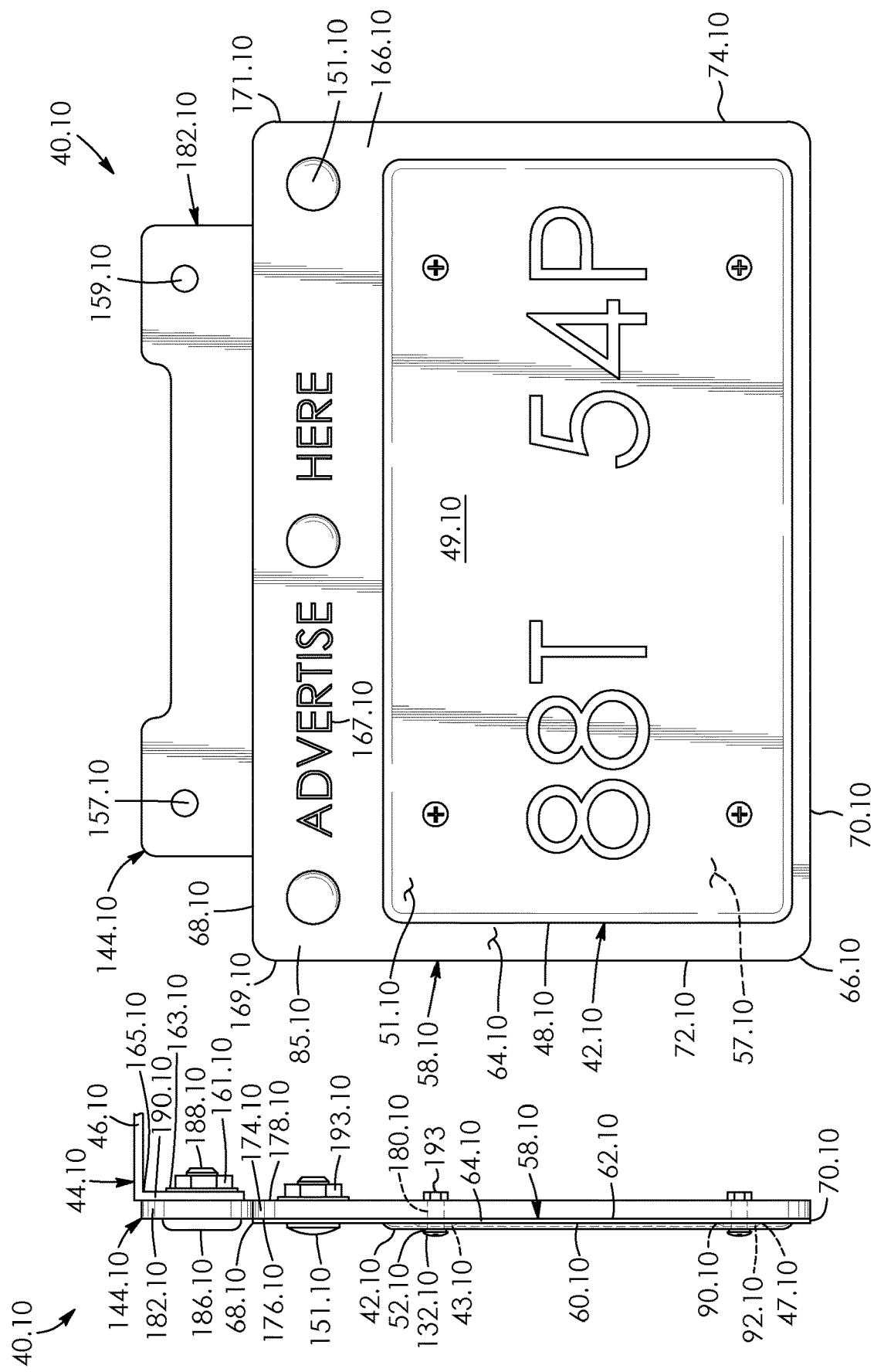

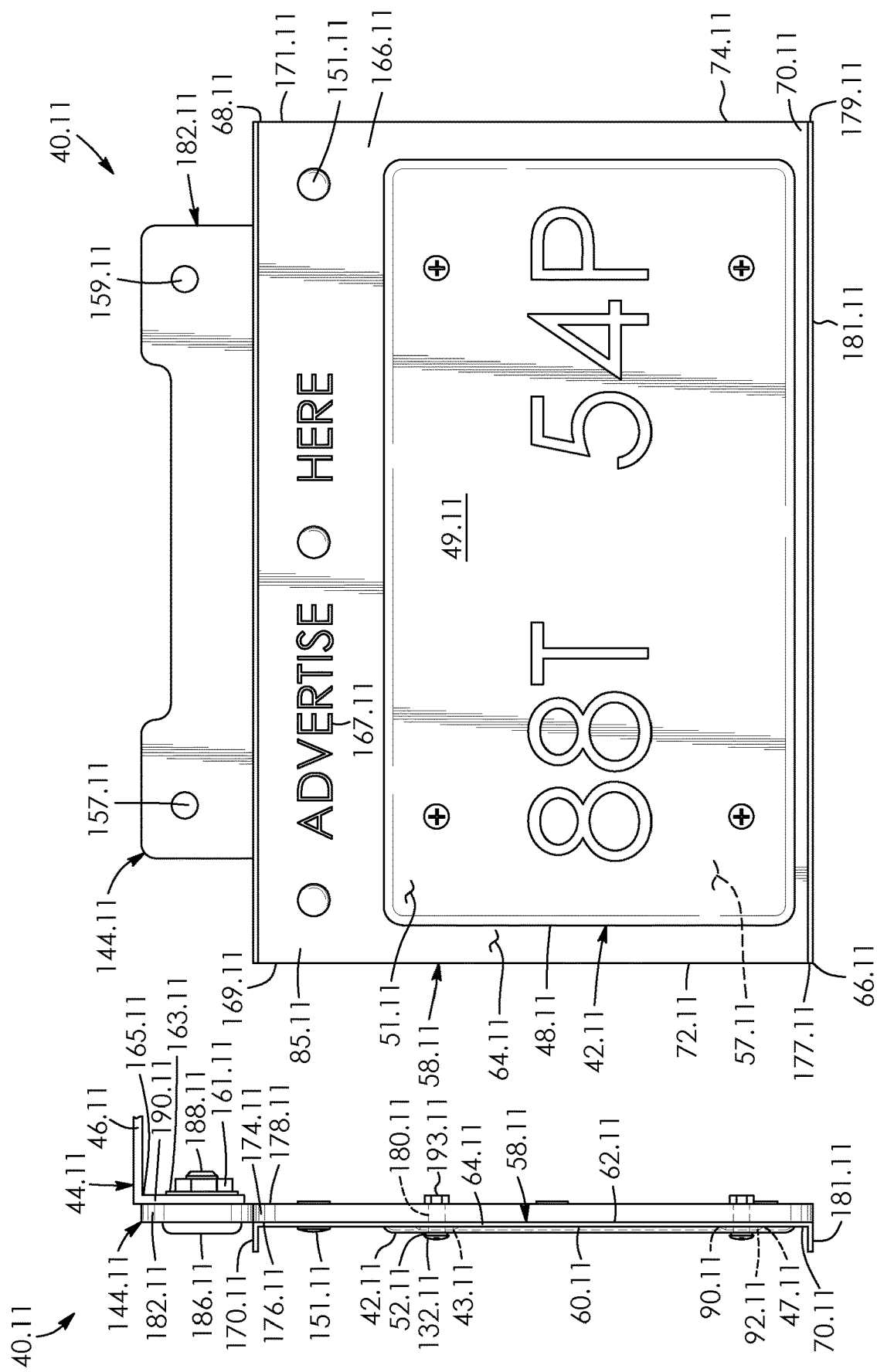

ADAPTER PLATE FOR MOUNTING A LICENSE PLATE ONTO A VEHICLE

FIELD OF THE INVENTION

There is provided an adapter plate. In particular, there is provided an adapter plate for mounting a license place onto a vehicle.

DESCRIPTION OF THE RELATED ART

United States Patent Publication No. 2010/0101123 to Pacleb provides a license plate holder for automobiles which allows the maximum viewable area for the plate and offers weather protection. This license plate holder allegedly avoids the problem of the license plate frame, tabs and mounting holes covering portions of the plate. The plate is held firmly in the cover even when the plate thickness varies and the cover attaches to the automobile at the back side.

United States Patent Publication No. 2014/0237870 to Eidsmore provides a license plate frame dimensioned for receipt around an associated license plate. The frame includes a first portion in parallel, spaced relation from a second portion and joined thereto along opposite ends by first and second interconnection portions. A handle extends outwardly from a first face of the second portion. First and second spaced openings along the first portion receive associated fasteners to secure the frame to the associated license plate and associated vehicle. First and second spaced-apart, segmented studs (circular or non-circular) extend outwardly from a second face of the second portion for receipt in corresponding openings in the associated license plate, or to abut against an outer surface thereof. The handle includes a first, upper surface and a second, lower surface, the lower surface including a region dimensioned for advertising.

U.S. Pat. No. 5,662,302 to Berry, Jr. provides a license plate hanger particularly for suspending a license plate from the rear frame of an associated vehicle. The license plate hanger is formed of a one-piece, nonmetallic, reinforced, multi-ply, resilient, substantially flat and substantially homogenous plate-like member defined by an upper hanger portion and a lower license plate attaching portion with a reduced neck portion therebetween. The material of the license plate hanger permits the neck portion to be deflected over and over again without permanent deformation and/or breakage and without damage to property or individuals. Preferably, the license plate attaching portion has a peripheral edge which projects beyond a peripheral edge of the license plate to thereby prevent damage to persons and property by the known sharp edge of a metallic license plate.

BRIEF SUMMARY OF INVENTION

There is provided, and it is an object to provide, an improved adapter plate assembly disclosed.

There is accordingly provided an adapter plate assembly for mounting a license plate to a vehicle. The assembly includes an adapter plate with a backing portion shaped to couple with and inhibit bending of the license plate. The assembly includes a resilient member having a lower portion connectable with the adapter plate and an upper portion for coupling to the vehicle. The resilient member is configured to enable the license plate to move slightly forward and rearward.

There is also provided an adapter plate assembly for mounting a license plate to a vehicle. The license plate has a recessed rear. The assembly includes an adapter plate with a plurality of spaced-apart protrusions. The protrusions are configured to abut and support the recessed rear of the license plate. The assembly includes a resilient member having a lower portion connectable with an upper peripheral portion of the adapter plate and an upper portion for coupling to the vehicle. The resilient member is configured to enable the license plate to move slightly forward and rearward.

BRIEF DESCRIPTION OF DRAWINGS

The invention will be more readily understood from the following description of preferred embodiments thereof given, by way of example only, with reference to the accompanying drawings, in which:

FIG. 7 is a perspective view of a female threaded connector of the adapter plate assembly;

FIG. 8 is a top plan view thereof;

FIG. 9A is an elevational view of a metal sheet and the connector of FIG. 7 positioned within a press assembly according to one aspect, for embedding the connector within the sheet;

FIG. 9B is an elevational view partially in cross-section of the sheet of FIG. 9A, with the connector embedded within the sheet and being shown partially in cross-section;

FIG. 32 is an exploded rear, top perspective view of an adapter plate assembly according to a fourth aspect, and a bracket for a rear portion of a trailer, the bracket being according to a fourth aspect and the trailer being shown in fragment;

FIG. 33 is a right side elevational view of the adapter plate assembly of FIG. 32 coupled to a license plate and the bracket of the trailer shown in FIG. 32;

FIG. 34 is an exploded, rear, top perspective of an adapter plate assembly according to a fifth aspect;

FIG. 35 is a right side elevational view of the adapter plate assembly of FIG. 34 coupled to a license plate and a bracket for a rear portion of a trailer, the bracket being similar to that shown in FIG. 32 and being shown in fragment;

FIG. 40 is an exploded rear, top perspective of an adapter plate assembly according to an eighth aspect;

FIG. 41 is a right side elevational view of the adapter plate assembly of FIG. 40 coupled to a license plate and a bracket for a rear portion of a trailer, the bracket being similar to that shown in FIG. 32 and being shown in fragment;

FIG. 42 is an exploded, rear, top perspective of a license plate and an adapter plate assembly according to a ninth aspect;

FIG. 43 is a right side elevational view of the adapter plate assembly of FIG. 42 coupled to the license plate of FIG. 42 and a bracket for a rear portion of a trailer, the bracket being similar to that shown in FIG. 32 and being shown in fragment;

FIG. 46 is a right side elevational view of the adapter plate assembly of FIG. 45 coupled to the license plate of FIG. 45 and a bracket for a rear portion of a trailer, the bracket being similar to that shown in FIG. 32 and being shown in fragment;

FIG. 47 is a front elevational view of the license plate and adapter plate assembly of FIG. 46, with the bracket of the rear portion of the trailer not being shown;

FIG. 49 is a right side elevational view of the adapter plate assembly of FIG. 48 coupled to the license plate of FIG. 48 and a bracket for a rear portion of a trailer, the bracket being similar to that shown in FIG. 32 and being shown in fragment; and FIG. 50 is a front elevational view of the license plate and adapter plate assembly of FIG. 48, with the bracket of the rear portion of the trailer not being shown.

DESCRIPTION OF THE PREFERRED EMBODIMENTS

Figure 1:
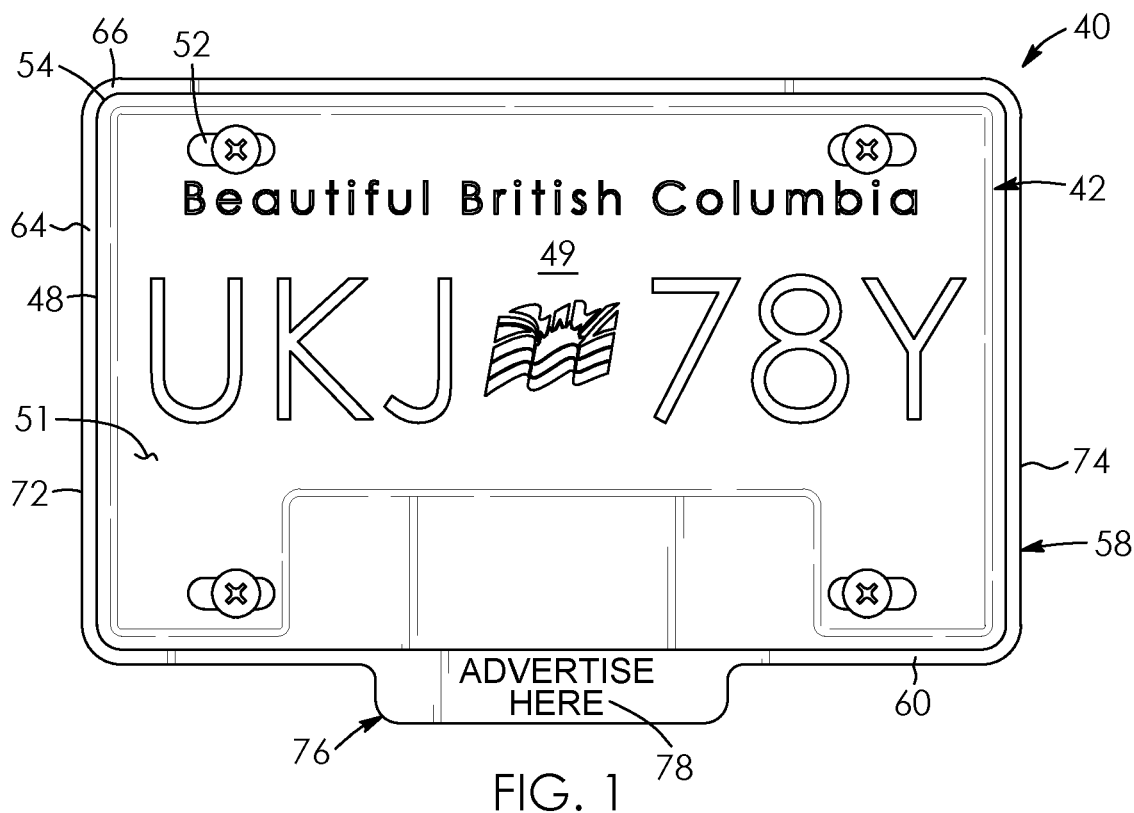
FIG. 1 is a front elevational view of an adapter plate assembly according to a first aspect, and a license plate connected thereto.
Figure 11:
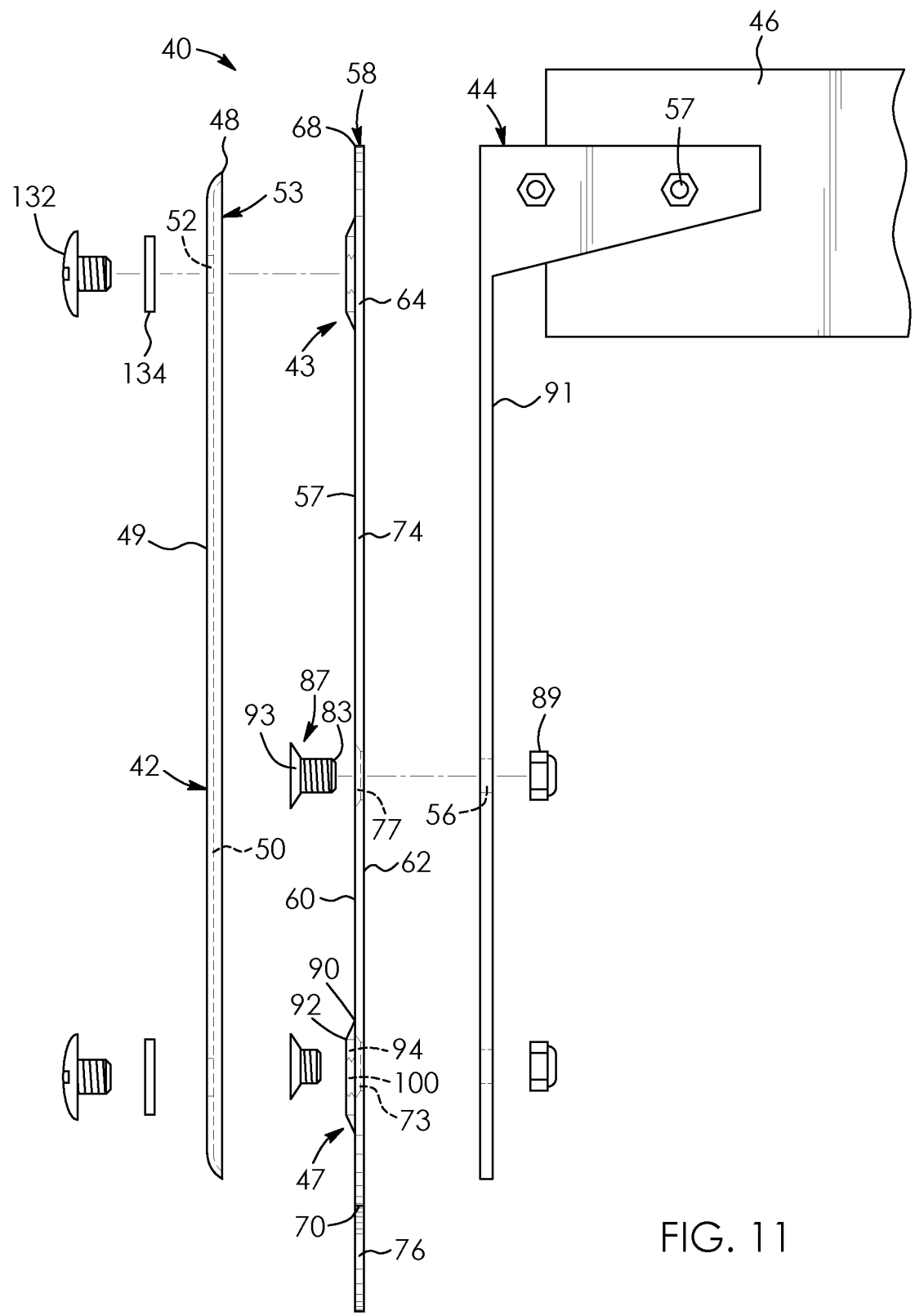
FIG. 11 is an exploded, side elevational view of the license plate and the adapter plate assembly of FIG. 1, a bracket of a vehicle according to one aspect and a fragmented portion of said vehicle.

Referring to the drawings and first to FIG. 1, there is shown an adapter plate assembly 40 for mounting a license plate 42 to a connector portion, in this example a bracket 44 of a vehicle 46, seen in FIG. 11. The vehicle may be a truck, trailer or motorcycle, for example, and is shown in fragment.

Figure 2:
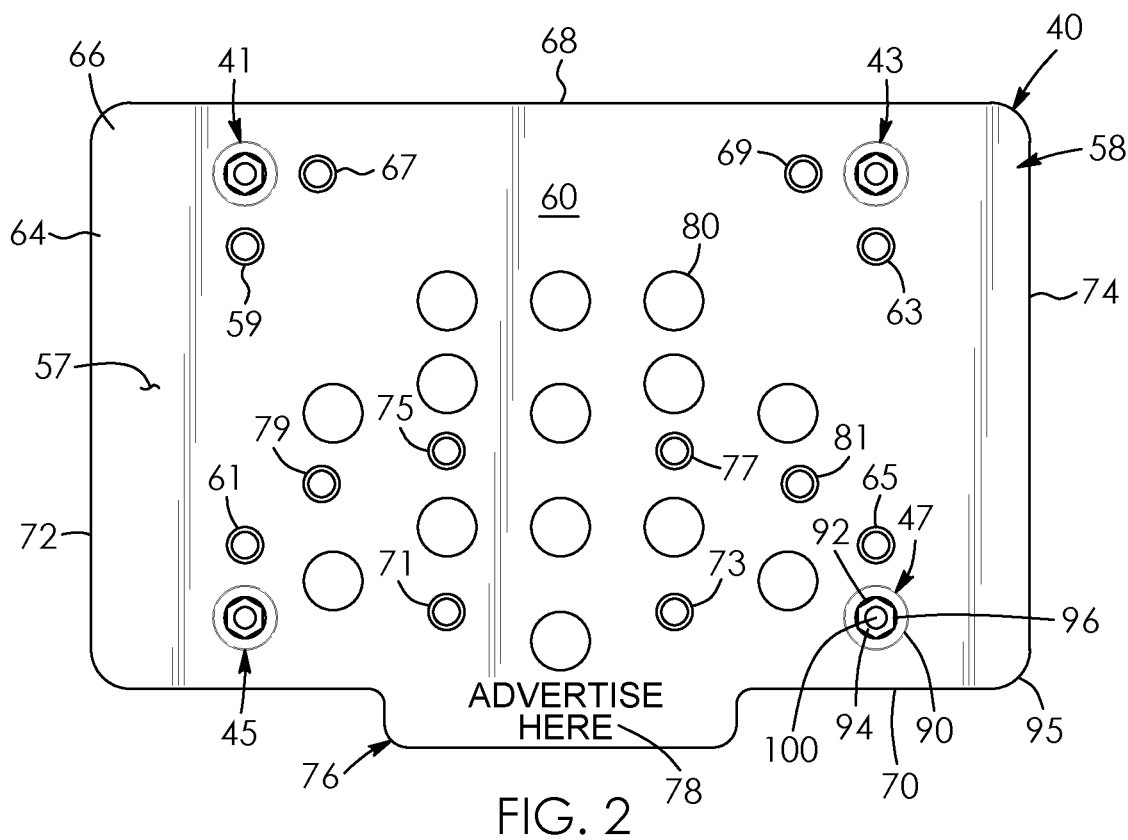
FIG. 2 is a front elevational view of the adapter plate assembly with the licensed plate of FIG. 1 removed.

As seen in FIGS. 1 and 2, the license plate is generally rectangular and has a peripheral edge or rim portion 48. Referring to FIG. 11, the license plate 42 has a front 49 having a planar area 51, and the license plate has a recessed rear 50 opposite the front. The recessed rear is centrally-located relative to the rim portion. The rim portion 48 and rear 50 of the license plate 42 form a recessed interior region 53. The license plate has a plurality of corners and a plurality of spaced-apart outer apertures extending therethrough adjacent to corners thereof, as seen in FIG. 1 by aperture 52 positioned adjacent to corner 54. The license plate, including its various parts and functions, is conventional.

Referring to FIG. 11, the bracket 44 has a plurality of inner or peripheral apertures extending therethrough, as shown by aperture 56. The bracket couples to the vehicle 46 in a conventional manner, in this example via bolts 57.

Figure 3:
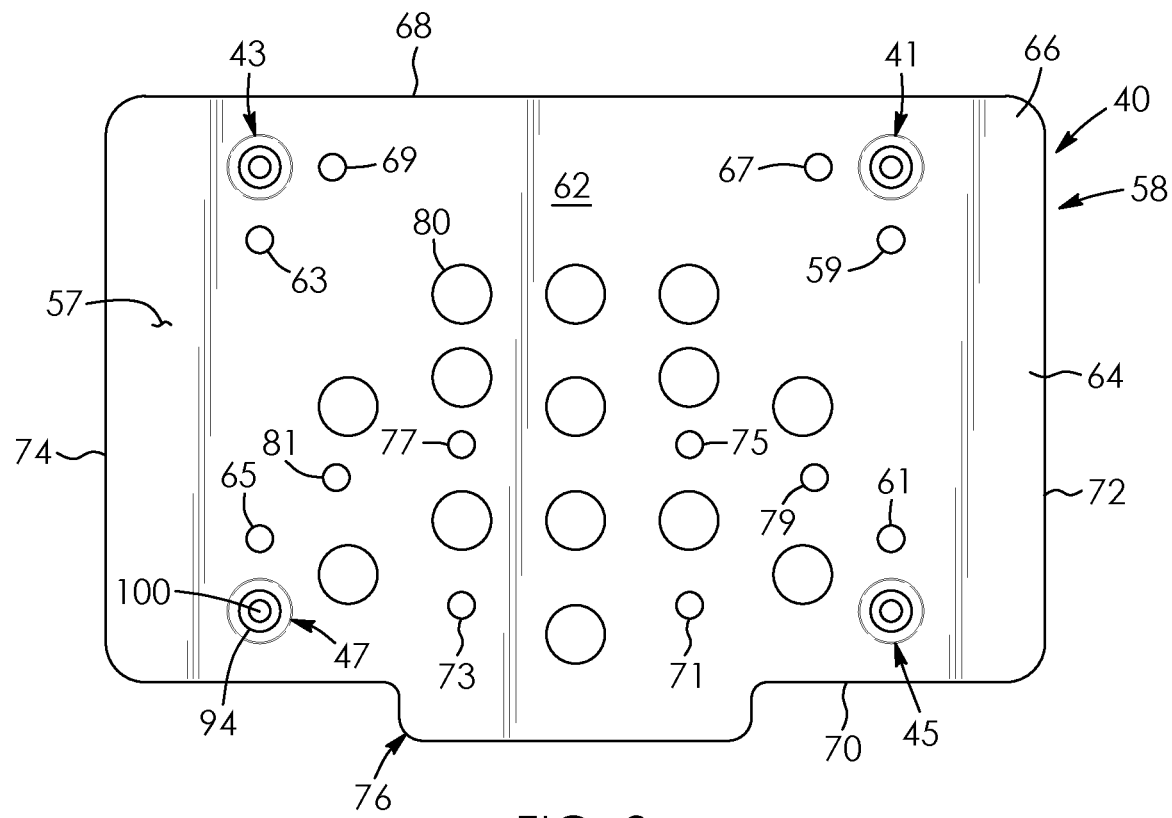
FIG. 3 is a rear elevational view thereof.
Figure 4:
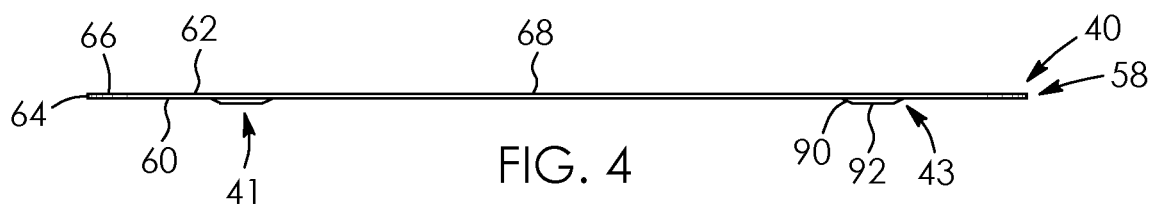
FIG. 4 is a top plan view thereof.
Figure 5:
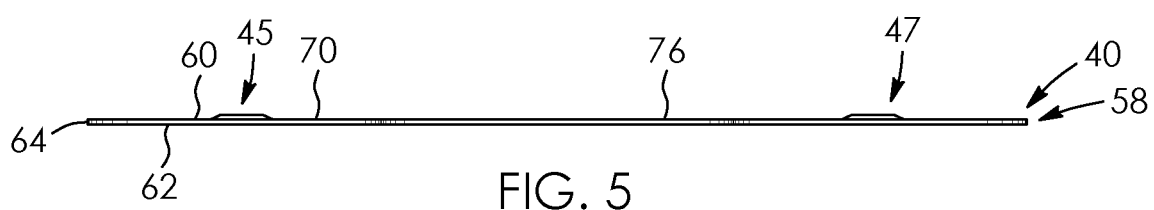
FIG. 5 is bottom plan view thereof.

As seen in FIG. 2, adapter plate assembly 40 includes an adapter plate 58 that is made of aluminum sheet in this example. However, this is not strictly required and the plate need not be made of aluminum and may be made of other materials in other examples. The adapter plate 58 has a front 60 which faces the recessed rear 50 of the license plate 42 seen in FIG. 11. As seen in FIG. 3, the adapter plate 58 has a rear 62 which faces the bracket 44 seen in FIG. 11. The front and rear of the adapter plate are generally rectangular in this example, with each having an area substantially equal to or greater than that of the license plate 42.

As seen in FIG. 2, the adapter plate has a backing portion 57 shaped to receive the license plate 42 seen in FIG. 1 thereon. The backing portion of the adapter plate is shaped to couple with the license plate and inhibit bending of the license plate, with the backing portion being shaped to span the planar area 51 of the license plate seen in FIG. 1. Referring back to FIG. 2, the backing portion of the adapter plate is generally rectangular in shape in this example. The backing portion 57 of the adapter plate has a top 68, bottom 70 spaced-apart from its top, a first side 72 and a second side 74 which is opposite its first side. The sides of the backing portion 57 of the adapter plate 58 extend between the top and bottom thereof. Referring to FIG. 1, the backing portion of the adapter plate 58 has a peripheral region 64 which aligns with, extends outwards relative to and extends around the peripheral rim portion 48 of the license plate 42. The backing portion of the adapter plate has a plurality of corners, in this example four corners, which correspond to and align with the corners of the license plate. This is seen in FIG. 1 by corner 66 of adapter plate 58 aligning with corner 54 of the license plate 42.

As seen in FIG. 2, the adapter plate 58 includes a lower peripheral portion, in this example in the form of a display tab 76 coupled to and extending downwards from the bottom 70 of the backing portion 57 of the adapter plate. The display tab is generally rectangular in shape in this example and centrally positioned between sides 72 and 74 of the backing portion of the plate 58. The display tab is configured to receive advertising and the like thereon, as indicated by the indicia "ADVERTISE HERE" indicated by numeral 78 and shown in FIGS. 1 and 2. In other embodiments, the tabs may have different shapes and could be in other positions such as the top of the backing portion 57 of the plate 58 for example.

Referring to FIG. 2, the adapter plate 58 includes a plurality of auxiliary apertures extending therethrough, as shown by aperture 80, positioned between the top 68 and bottom 70 and sides 72 and 74 of the backing portion 57 of the adapter plate. These auxiliary apertures may function to save weight by reducing the amount of metal or other material that may otherwise be needed to form the plate 58.

As seen in FIG. 2, the adapter plate 58 includes a plurality of inner apertures extending therethrough. These include: a first pair of apertures 59 and 61 that are aligned in a first column and positioned adjacent to side 72 of the backing portion 57 of the plate 58; a second pair of apertures 63 and 65 that are aligned in a second column and positioned adjacent to side 74 of the backing portion of the plate 58; a third pair of apertures 67 and 69 that are aligned in a first row and positioned adjacent to top 68 of the backing portion 57 of the adapter plate 58; a fourth pair of apertures 71 and 73 that are aligned in a second row and positioned adjacent to bottom 70 of the backing portion 57 and display tab 76 of plate 58; a fifth pair of apertures 75 and 77 that are aligned in a third row and interposed between the top and bottom of the backing portion of the adapter plate; and a sixth pair of apertures 79 and 81 that are aligned in a fourth row and interposed between apertures 75 and 77 and bottom 70 of the backing portion 57 of the plate 58.

Apertures 67 and 79 align in parallel with side 72 of the backing portion 57 of the plate 58 in this example and apertures 69 and 81 align in parallel with side 74 of the backing portion of the plate in this example. Apertures 67, 69, 79 and 81 are arranged so as to form a first rectangular arrangement in this example. Apertures 59 and 61 align in parallel with side 72 of the backing portion 57 of the plate 58 in this example and apertures 63 and 65 align in parallel with side 74 of the backing portion of the plate in this example. Apertures 59, 61, 63 and 65 are arranged so as to form a second rectangular arrangement in this example.

Apertures 71 and 75 align in parallel with side 72 of the backing portion 57 of the plate 58 in this example and apertures 73 and 77 align in parallel with side 74 of the backing portion of the plate in this example. Apertures 71, 73, 75 and 77 are arranged so as to form a third rectangular arrangement in this example. Each of the inner apertures 59, 61, 63, 65, 67, 69, 71, 73, 75, 77, 79 and 81 is tapered inwardly in a direction extending from the front 60 to the rear 62 of the adapter plate in this example, as seen by apertures 73 and 77 in FIG. 11.

Figure 12:
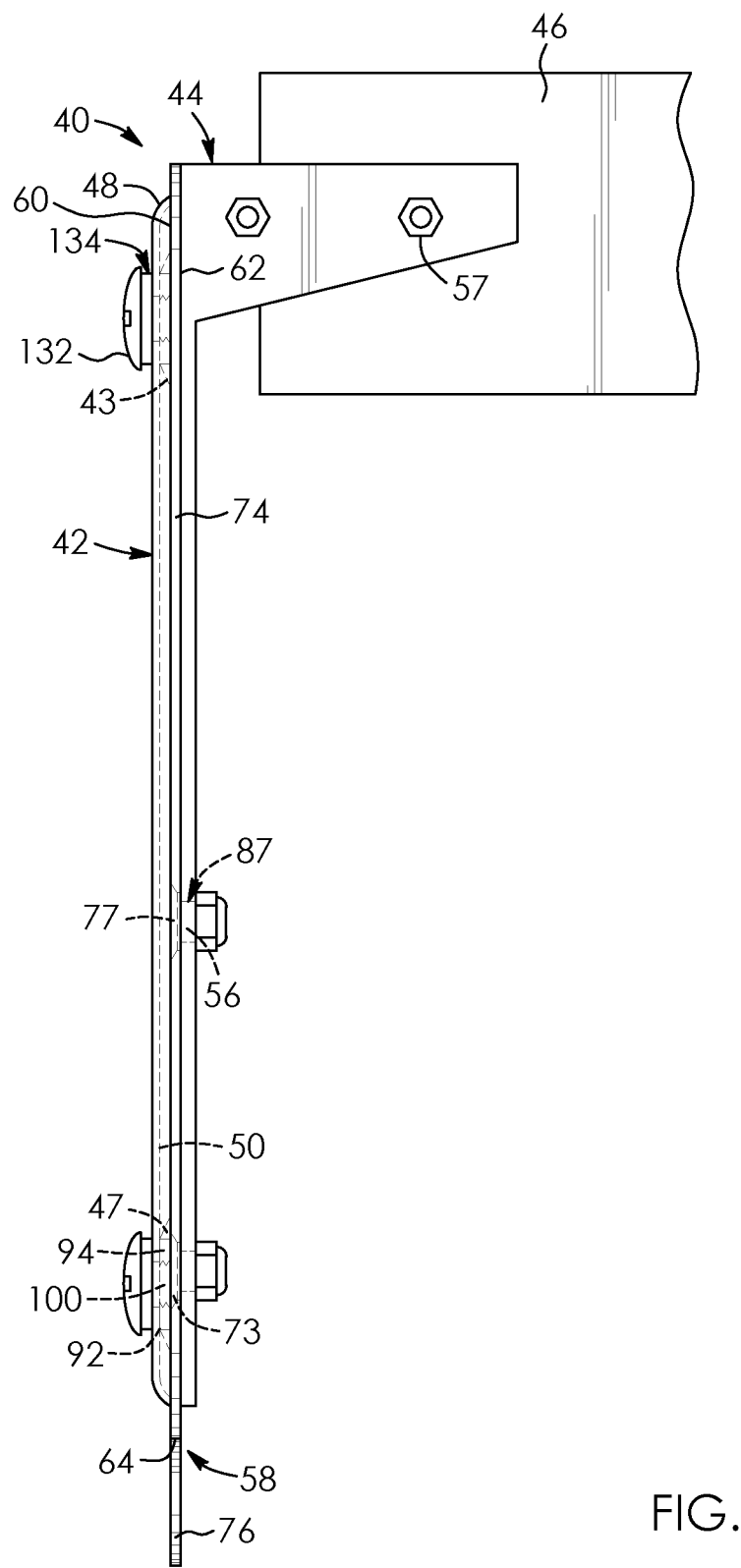
FIG. 12 is a side elevational view of the license plate, adapter plate assembly, bracket and fragmented portion of the vehicle of FIG. 11, the license plate, adapter plate assembly, bracket and fragmented portion being shown coupled together in assembled form.

The inner apertures of the adapter plate 58, as seen by aperture 77 in FIG. 11, are configured to align with respective peripheral apertures of the bracket 44, as seen by peripheral aperture 56 in FIG. 11. The adapter plate 58 is selectively connectable to the bracket via a plurality of fasteners, which in this example are countersunk bolts 87, shown in FIG. 11, which partially extend through apertures 77. The bolts may be secured in place via nuts 89 which may abut the rear 91 of bracket 44 and threadably couple to the threaded ends 83 of the bolts. The use of countersunk bolts and tapered inner apertures 77 ensures that the heads 93 of the bolts 87 are flush with front 60 of plate 58 when the plate is so connected to the bracket as seen in FIG. 12.

Figure 6:
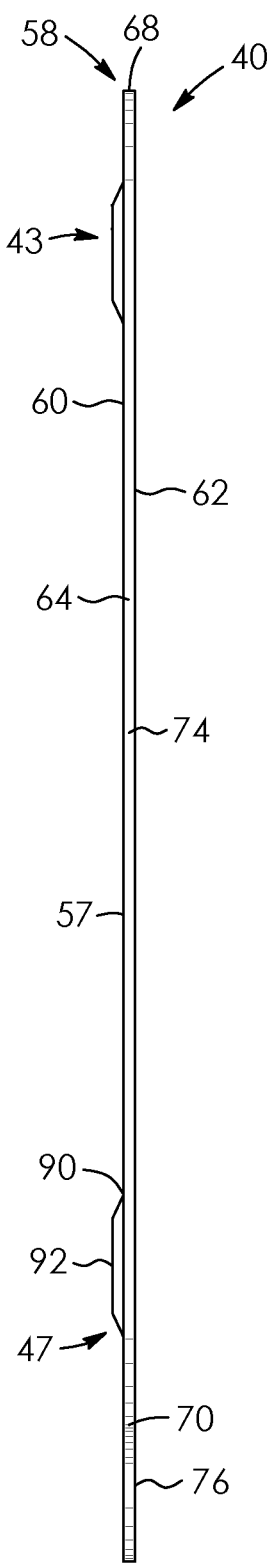
FIG. 6 is a right side view of the adapter plate assembly of FIG. 2, with the left side view being a mirror image thereof.

Referring back to FIG. 2, the adapter plate assembly 40 includes a plurality of spaced-apart protrusions 41, 43, 45 and 47 adjacent to respective ones of the corners of plate 58, as seen by protrusion 47 adjacent to corner 95 of the plate. The protrusions are embossments of the adapter plate in this embodiment and are frustoconical in this example. As seen in FIG. 6, each of the protrusion 47 has a proximal end 90 coupled to, adjacent to and in this example integrally connected to and formed with the front 60 of the plate 58. Each protrusion has a distal end 92 spaced-apart from the proximal end thereof and spaced-apart from the front of the plate.

As seen in FIG. 2, protrusions 41 and 45 align in a first column adjacent to and extending in parallel with side 72 of the backing portion of the plate 58. Protrusions 43 and 47 align in a second column which is spaced-apart from the first column and which is adjacent to and which extends in parallel with side 74 of the backing portion 57 of the adapter plate in this example. Protrusions 41 and 43 align in a first row adjacent to and extending in parallel with top 68 of the backing portion 57 of the adapter plate 58. Protrusions 45 and 47 align in a second row which is spaced-apart from the first row and which is adjacent to and which extends in parallel with bottom 70 of the backing portion 57 of the adapter plate.

The pair of inner apertures 59 and 61 of the adapter plate 58 are interposed between and align with the first column of protrusions 41 and 45 of the adapter plate in this example. The pair of inner apertures 63 and 65 of the adapter plate are interposed between and align with the second column of the protrusions 43 and 47 of the adapter plate in this example. The pair of inner apertures 67 and 69 of the adapter plate 58 are interposed between and align with the first row of protrusions 41 and 43 of the adapter plate in this example. The pair of inner apertures 71 and 73 of the adapter plate are interposed between and align with the second row of protrusions 45 and 47 of the adapter plate in this example.

The inner apertures of the adapter plate 58 may be said to comprise the following four pairs each of which aligns adjacent to a respective one of the protrusions: apertures 59 and 67 aligning diagonal and adjacent to protrusion 41; apertures 63 and 69 aligning diagonal and adjacent to protrusion 43; apertures 61 and 79 aligning diagonal and adjacent to protrusion 45; and apertures 65 and 81 aligning diagonal and adjacent to protrusion 47.

FIGS. 7 to 10 show how the protrusions are formed in the plate 58 according to one preferred embodiment. The adapter plate 58 is first formed in a generally rectangular shape similar in size to that of a license plate as seen in FIG. 2. Next, a plurality of female threaded connectors, in this example self-clinching flush fasteners such as a Pemsert® are selected, as shown by connector 94 seen in FIGS. 7 and 8. Each fastener in this example includes an annular, hexagonal top portion 96, a flanged bottom portion 98 coupled thereto and a threaded aperture 100 extending therethrough from the top portion through to the bottom portion thereof. Pemsert® fasteners are off-the-shelf products which may be purchased at PennEngineering, having an office at 5190 Old Eston Rd., Danboro, Pa. 18916, USA. The connectors are made of steel in this example, though this is not strictly required and they may be made of materials in other embodiments.

Referring to FIG. 9A, plate 58 and respective connectors 94 are next positioned within a press assembly 102. The press assembly includes a pair of platens 104 and 106 between which the plate 58 and connector are pressed together, as shown by movement arrows 108 and 110. During this process, the connectors are aligned so as to correspond to locations of respective apertures 52 of the license plate 42 seen in FIG. 1. The pressing causes the connectors 94 to become embedded within the plate 58 with the top portions 96 of the connectors 94 aligning with the front 60 of the plate and the bottom portions 98 of the connectors aligning with the rear 62 of the plate, as seen in FIG. 9B. In this manner, the adapter plate assembly 40 is provided with a plurality of threaded, outer apertures 100 which align with the outer apertures 52 of the license plate 42 seen in FIG. 1.

Figures 10A, 10B:
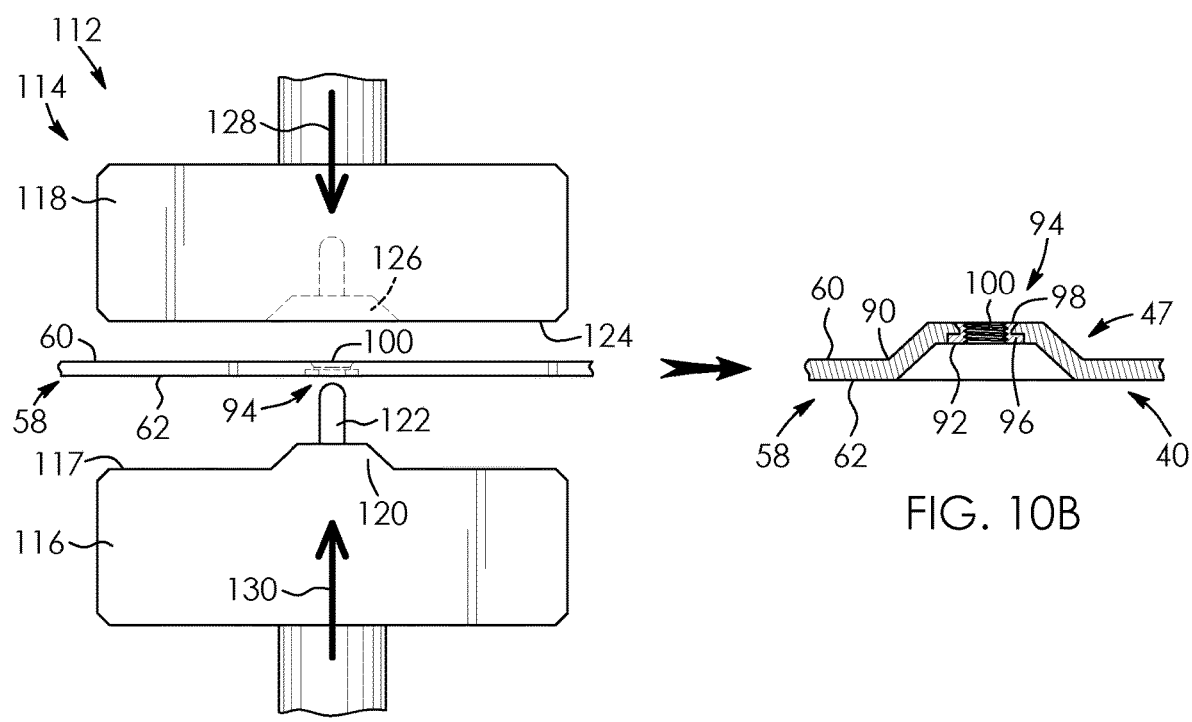
FIG. 10A is an elevational view of the metal sheet so embedded with a connector, the sheet and connector being shown in cross-section, the sheet being positioned between embossment tools for forming a protrusion within the sheet at the location of the connector thereby, the sheet being shown in fragment.
FIG. 10B is a cross-sectional elevational view of the metal sheet of FIG. 10A with the protrusion formed thereafter, the sheet being shown in fragment.

The protrusions 41, 43, 45 and 47 seen in FIG. 2 are next formed by an embossment assembly 112 seen in FIG. 10A in this example. The embossment assembly includes an embossing tool 114 comprising a male member and a corresponding female member, in this example in the form of a pair of tool bits 116 and 118. Tool bit 116 has a substantially planar surface 117 for abutting the rear 62 of the plate 58. The bit has a frustoconical portion 120 extending outwards from planar surface 117 and a centrally-disposed pin 122 extending outwards from the frustoconical portion in this example. The pin is shaped to selectively extend through the outer apertures 100 of plate 58. The extent to which the frustoconical portion 120 of the bit 116 extends outwards corresponds to the desired amount of outward extension of the distal end 92 of the protrusion 47 relative to front 60 of the plate 58 as seen in FIG. 10B.

As seen in FIG. 10A, tool bit 118 has a corresponding substantially planar surface 124 shaped to abut front 60 of the plate 58. The bit further has a recessed portion 126 which is complementary in shape to the frustoconical portion 120 and pin 122 of bit 116 so as to receive them. The pin 122 is aligned with aperture 100, and the bits 116 and 118 are then pressed together, as shown by movement arrows 128 and 130. This causes respective protrusions 47 to be formed in the plate 58, as seen in FIG. 10B.

Referring to FIGS. 11 and 12, the protrusions so formed, as seen by protrusions 43 and 47, are shaped to abut and support the recessed rear 50 of the license plate 42. The protrusions are shaped such that when their distal ends 92 thereof abut the recessed rear of the license plate, the peripheral region 64 of the adapter plate 58 abuts and aligns with the peripheral rim portion 48 of the license plate, as seen in FIGS. 1 and 12.

Referring back to FIG. 11, the adapter plate assembly 40 includes a plurality of fasteners 132 configured to extend through respective apertures 52 of the license plate 42 and outer apertures 100 of the protrusions 47 for coupling to the license plate to the adapter plate in a flush and secure manner. The assembly 40 may further include washers 134 interposed between the fasteners 132 and the front 49 of the license plate 42. FIG. 12 shows the license plate 42 so coupled to the adapter plate 58 and the adapter plate so coupled to bracket 44 of vehicle 46.

Figure 13:
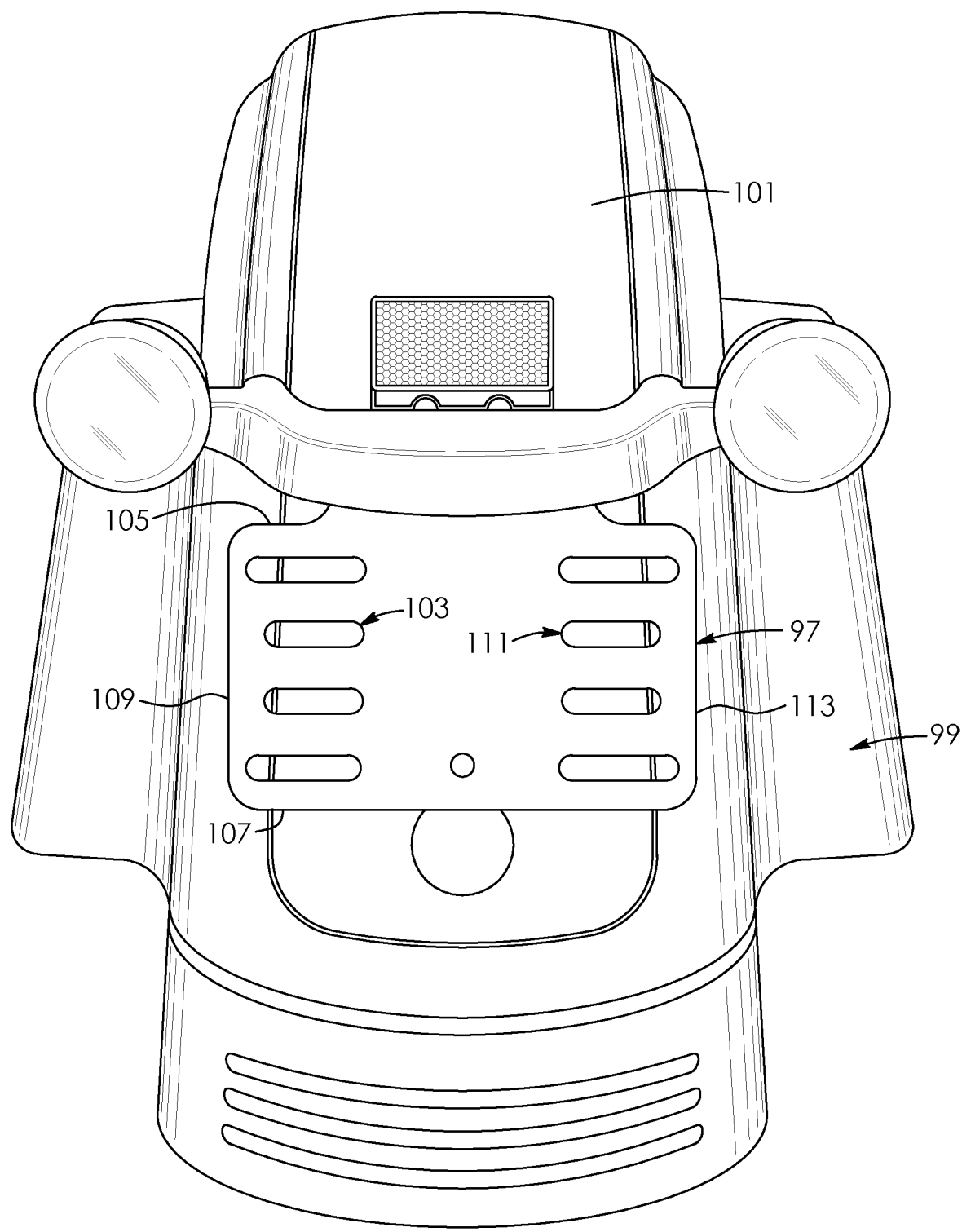
FIG. 13 is front elevational view of a bracket for a rear portion of a vehicle, the bracket being according to a second aspect.

FIG. 13 shows an off-the-shelf bracket 97 according to a second aspect that may be suitable for some American license plates (not shown) to connect thereto. The bracket couples to a rear portion 99 of a motorcycle 101 in this example. The bracket 97 in this case has a first plurality of spaced-apart longitudinally-extending slots, as shown by slot 103, which extend from the top 105 to the bottom 107 of the bracket adjacent to a first side 109 thereof. The bracket has a second plurality of spaced-apart longitudinally-extending slots, as shown by slot 111, which extend from the top 105 to the bottom 107 of the bracket adjacent to a second side 113 thereof. Bracket 97 may be too small for license plates in other jurisdictions, such as various provinces of Canada.

Figure 14:
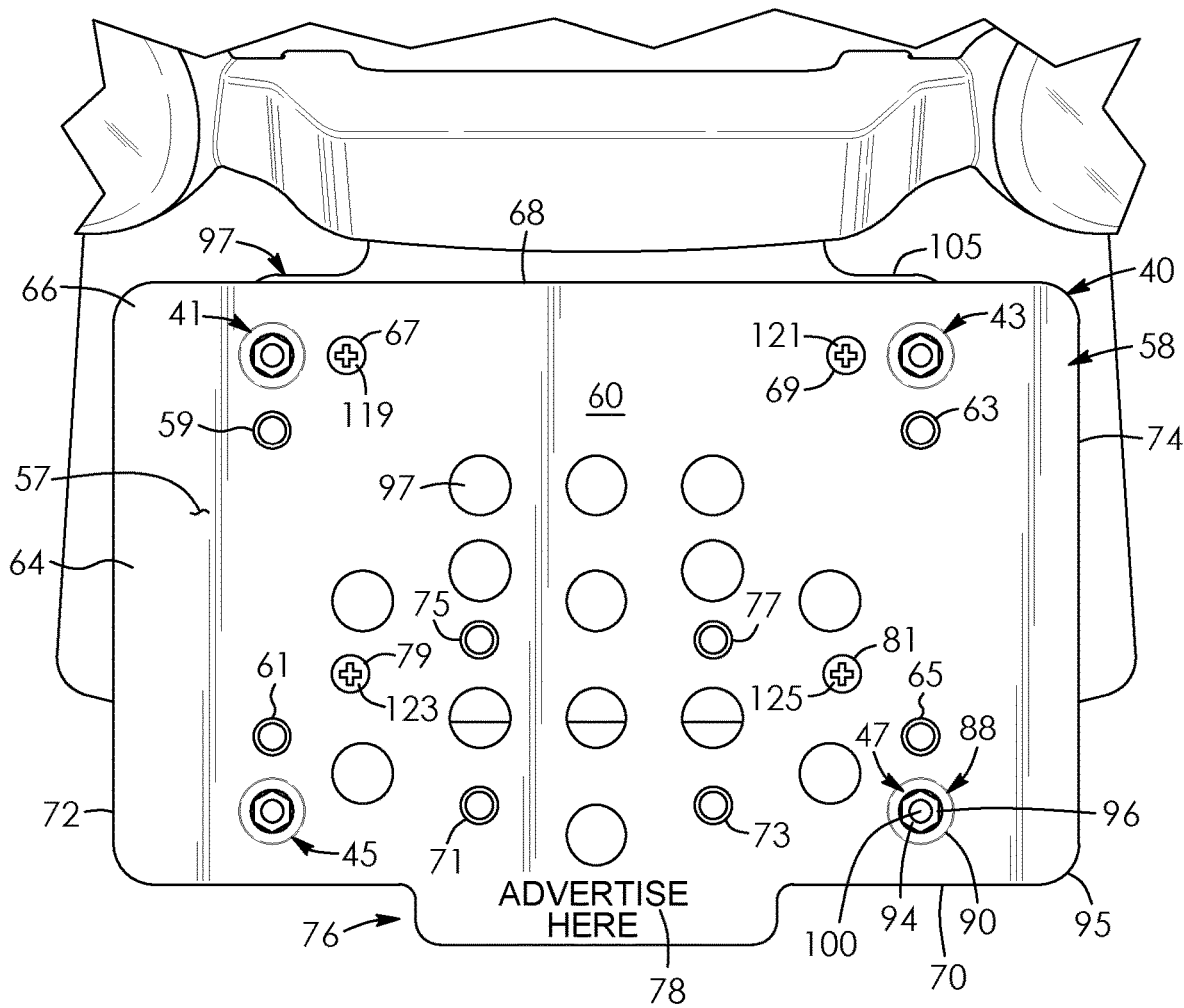
FIG. 14 is a front elevational view of the adapter plate assembly of FIG. 2 coupled to the bracket of FIG. 13, the rear portion of the vehicle being shown in fragment.

As seen in FIG. 14, fasteners 119 and 121 extend through upper apertures 67 and 69, respectively, of plate 58 and upper ones of the plurality of slots 103 and 111 of the bracket seen in FIG. 13. Fasteners 123 and 125 seen in FIG. 14 extend through lower apertures 79 and 81 of the adapter plate and lower ones of the plurality of slots 103 and 111 of the bracket 97 seen in FIG. 13 to couple the adapter plate to the bracket thereby. Thus, the first rectangular arrangement of inner apertures 67, 69, 79 and 81 of the adapter plate 58 are adapted to couple with such slotted, off-the-shelf brackets 97. Referring to FIG. 14, the adapter plate 58 so coupled to the bracket may enable a larger license plate, for example, to be threadably coupled to the adapter plate via protrusions 41, 43, 45 and 47 in a manner otherwise substantially the same as that described for FIGS. 11 and 12.

Figure 15:
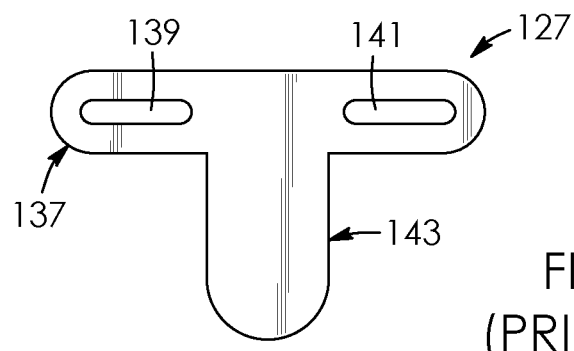
FIG. 15 is a front elevational view of a bracket for a rear portion of a vehicle, the bracket being according to a third aspect.

FIG. 15 shows an off-the-shelf bracket 127 according to a third aspect suitable for some American license plates (not shown) to connect thereto. The bracket is T-shaped in this example. The bracket 127 couples to a rear portion 99 of motorcycle 101 seen in FIG. 16 in this example. Referring to FIG. 15, the bracket 127 in this example has a horizontally-extending upper portion 137. The bracket has a pair of spaced-apart, longitudinally-extending slots 139 and 141 which extend through the upper portion thereof. The bracket 127 has a centrally-disposed vertically-extending portion 143 integrally connected to, formed with and extending downwards from upper portion 137 thereof. Likewise, bracket 127 may be too small for license plates in other jurisdictions, such as various provinces of Canada, and/or may inadequately support the license plate, leading to bending of the corners of the license plate.

Figure 16:
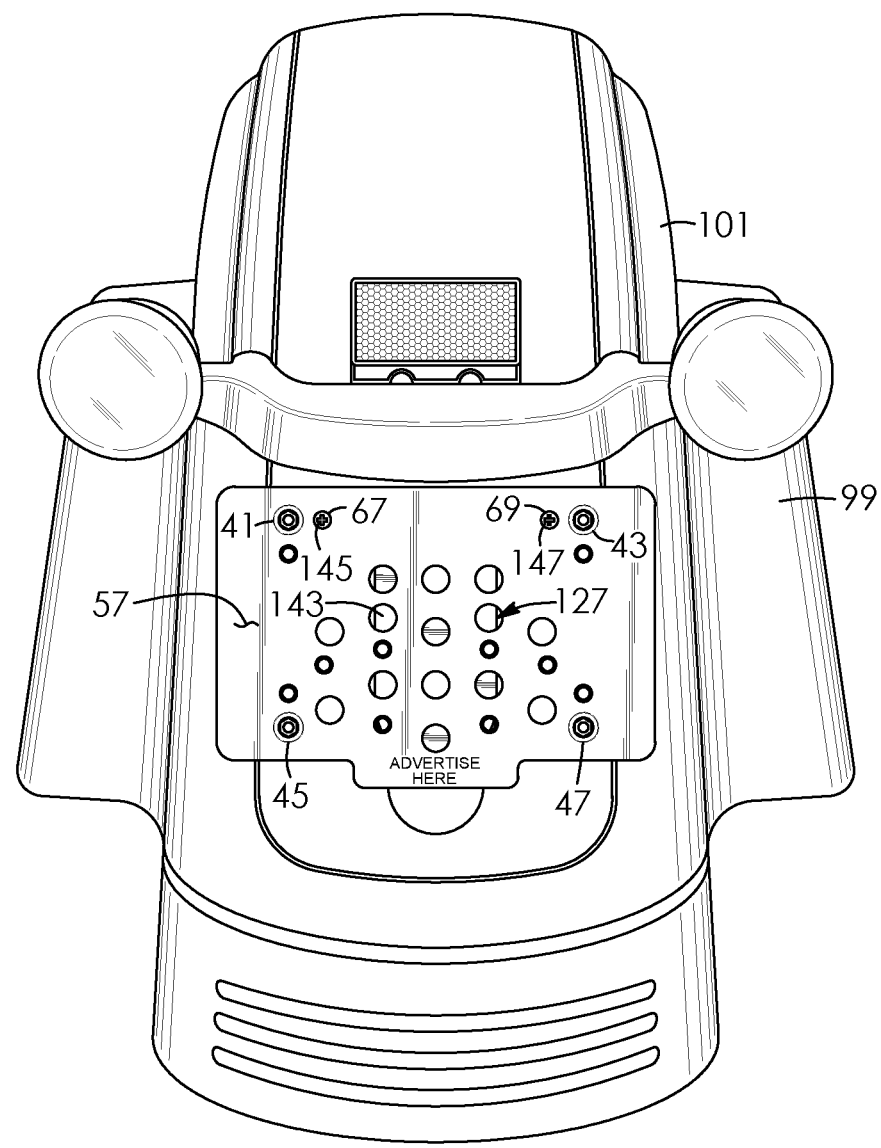
FIG. 16 is a front elevational view of the adapter plate assembly of FIG. 2 coupled to the bracket of FIG. 15.

Referring to FIG. 16, fasteners 145 and 147 extend through respective ones of the upper apertures 67 and 69 of the adapter plate 58 and respective ones of the slots 139 and 141 of the bracket 127 seen in FIG. 15 to couple the adapter plate 58 to bracket 127 thereby. In this manner, the adapter plate so coupled to the bracket may thus enable a license plate to be threadably connected to the adapter plate via protrusions 41, 43, 45 and 47 in a manner which may better support the license plate and as otherwise substantially the same as that described for FIGS. 11 and 12.

Figures 17A, 17B:
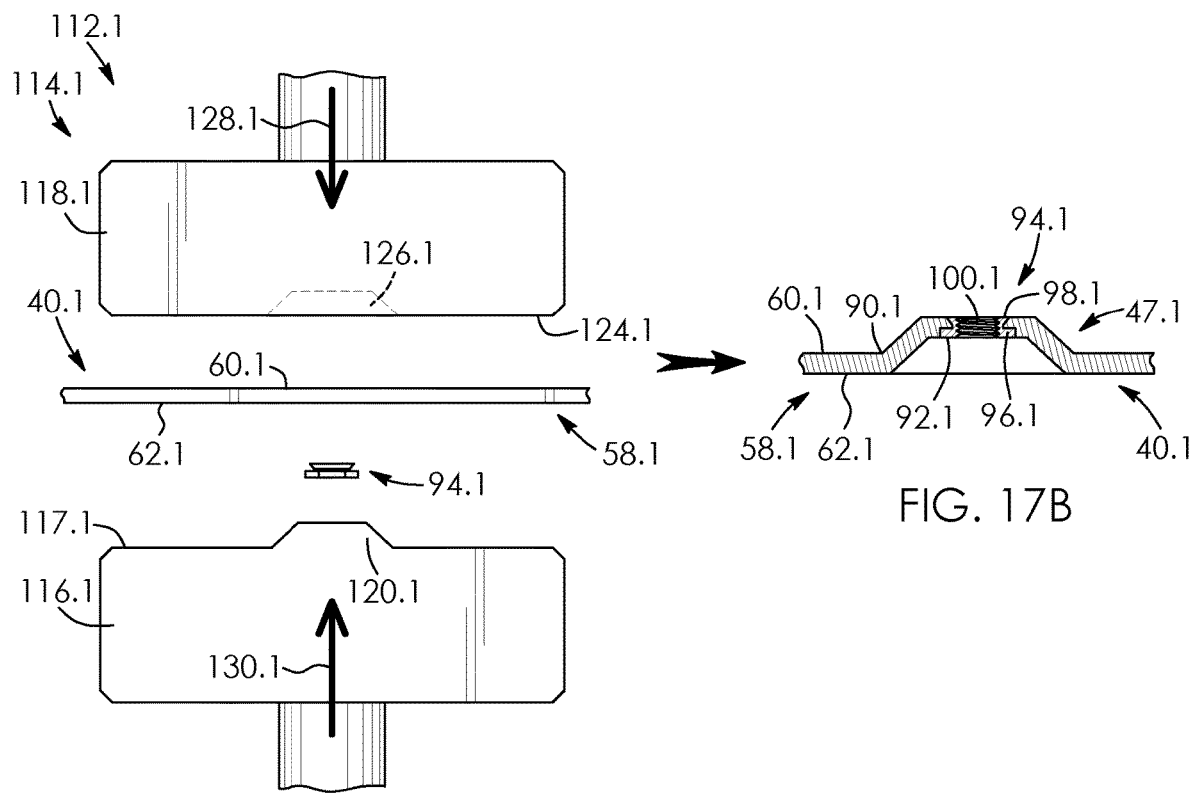
FIG. 17A is an elevational view of a metal sheet and the connector of FIG. 7 positioned within a press assembly according to a further aspect for embedding the connector within the sheet.
FIG. 17B is a cross-sectional elevational view of the sheet of FIG. 17A, with the connector embedded within the sheet and being shown partially in cross-section.

FIGS. 17A and 17B show a process for forming the adapter plate of FIGS. 1 to 16 according to a second aspect. Like parts have like numbers and functions as the adapter plate assembly 40 and process shown in FIGS. 1 to 16 with the addition of decimal extension ".1". Adapter plate assembly 40.1 is formed in a substantially similar manner to that shown in FIGS. 9A to 10B with the following exceptions. In this example, connectors 94.1 are pressed between bits 116.1 and 118.1 and a metal sheet so as to embed the connectors within plate 58.1 while also forming protrusions 47.1 within the same step. The process shown in FIGS. 17A and 17B may thus function to reduce the amount of steps required to produce adapter plate 58.1.

FIGS. 18 to 23 show an adapter plate assembly 40.2 according to a second aspect. Like parts have like numbers and functions as the adapter plate assembly 40 shown in FIGS. 1 to 16 with the addition of decimal extension ".2". Adapter plate assembly 40.2 is substantially the same as adapter plate assembly 40 shown in FIGS. 1 to 16 with the following exceptions.

Figure 23:
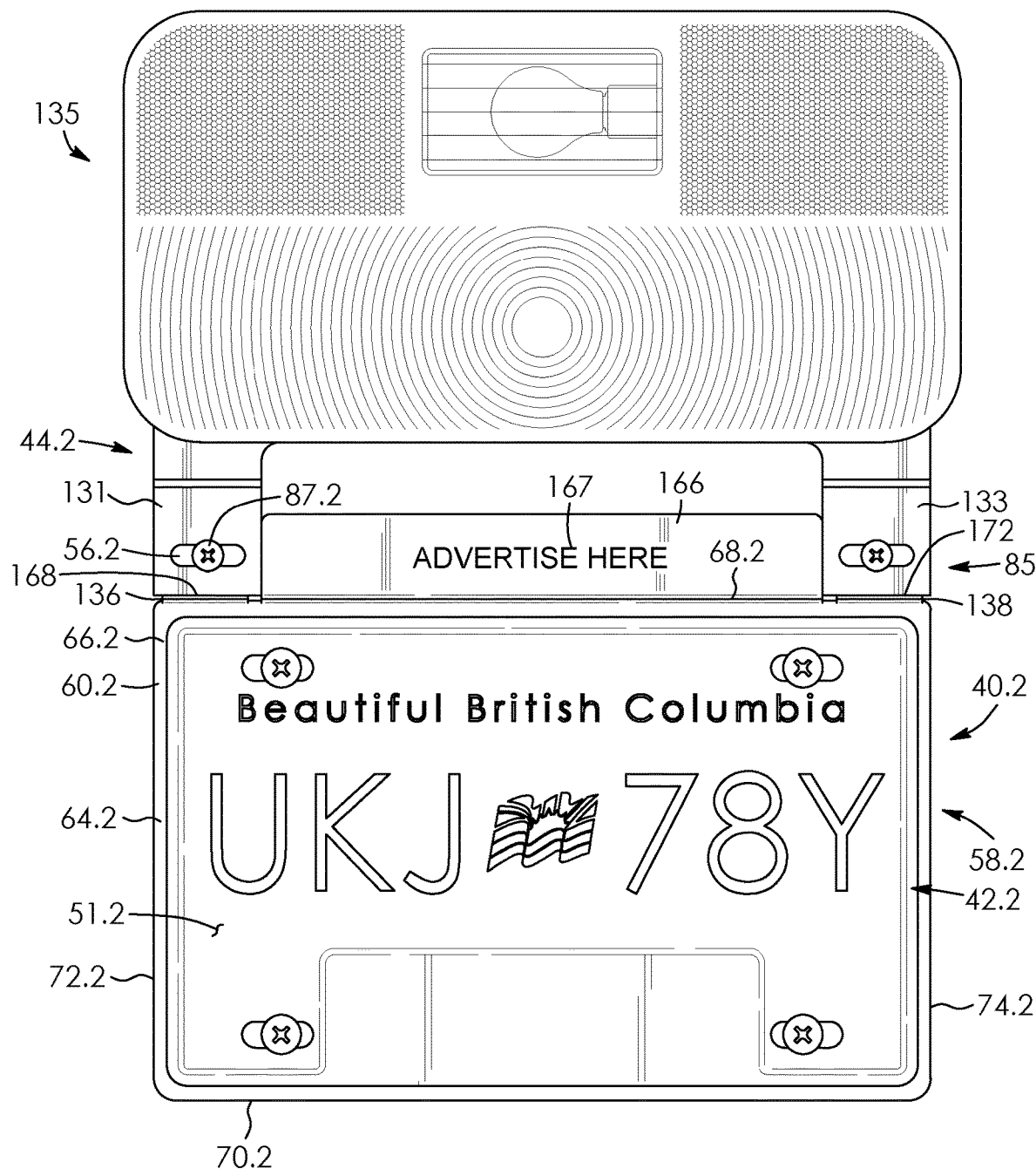
FIG. 23 is a front elevational view of the adapter plate assembly of FIG. 18, a license plate connected thereto, and a light assembly for a vehicle, the adapter plate assembly having a pair of spaced-apart connector tabs and the light assembly being shown coupled to the connector tabs thereof.
Figure 24:
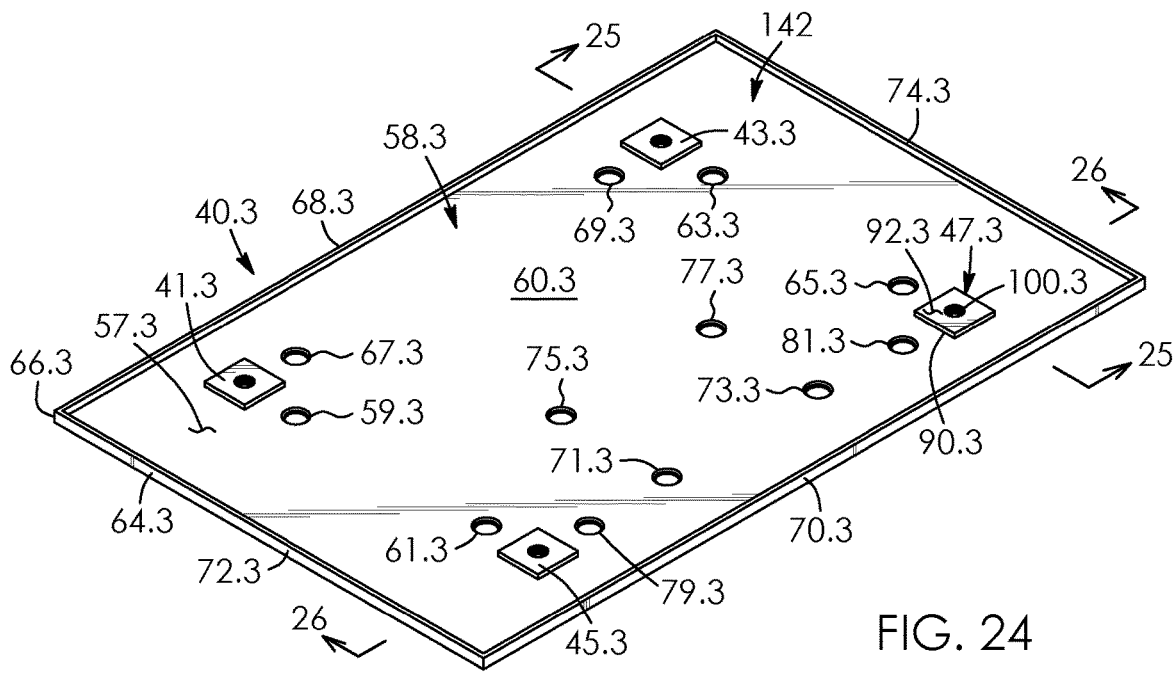
FIG. 24 is a perspective view of an adapter plate assembly according to a third aspect.
Figure 25:
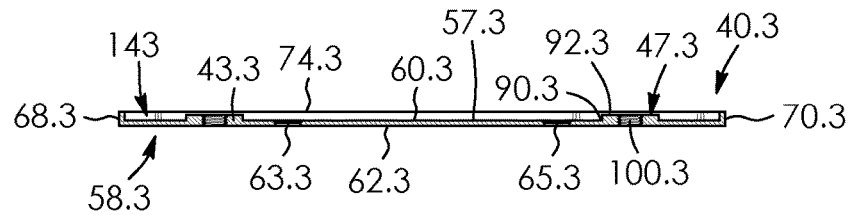
FIG. 25 is a cross-sectional view of the adapter plate assembly of FIG. 24 taken along lines 25-25 thereof.
Figure 26:
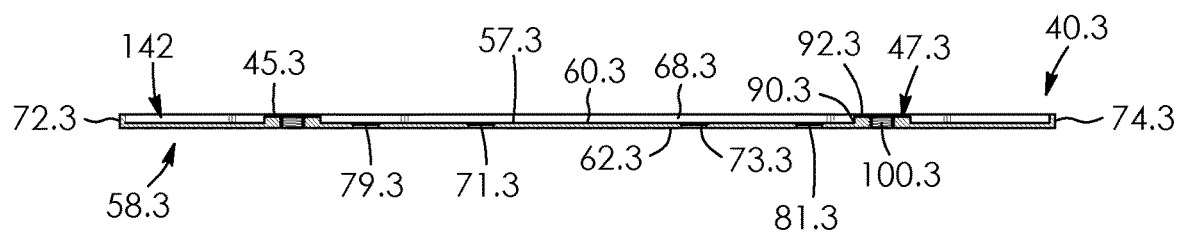
FIG. 26 is a cross-sectional view of the adapter plate assembly of FIG. 24 taken along lines 26-26 thereof.
Figure 27:
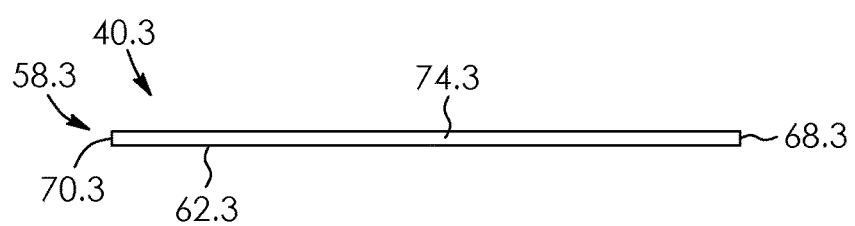
FIG. 27 is a right side view of the adapter plate assembly of FIG. 24, with the left side being a mirror image thereof.
Figure 28:
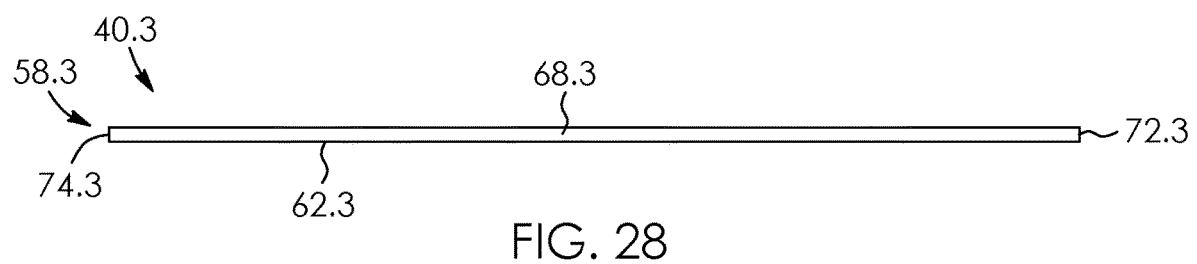
FIG. 28 is a top plan view of the adapter assembly of FIG. 24, with the bottom plan view being a mirror image thereof.

As seen in FIG. 23, bracket 44.2 comprises two spaced-apart lower portions 131 and 133 which are part of a light assembly 135 of the vehicle, in this example a trailer. Light assemblies for trailers, including their various parts and functionings, are known per se and therefore will not be described in detail. Each of the lower portions of the bracket 44.2 has a horizontally-extending slotted aperture in this example extending therethrough, as shown by aperture 56.2 extending through lower portion 131 of the bracket.

Figure 18:
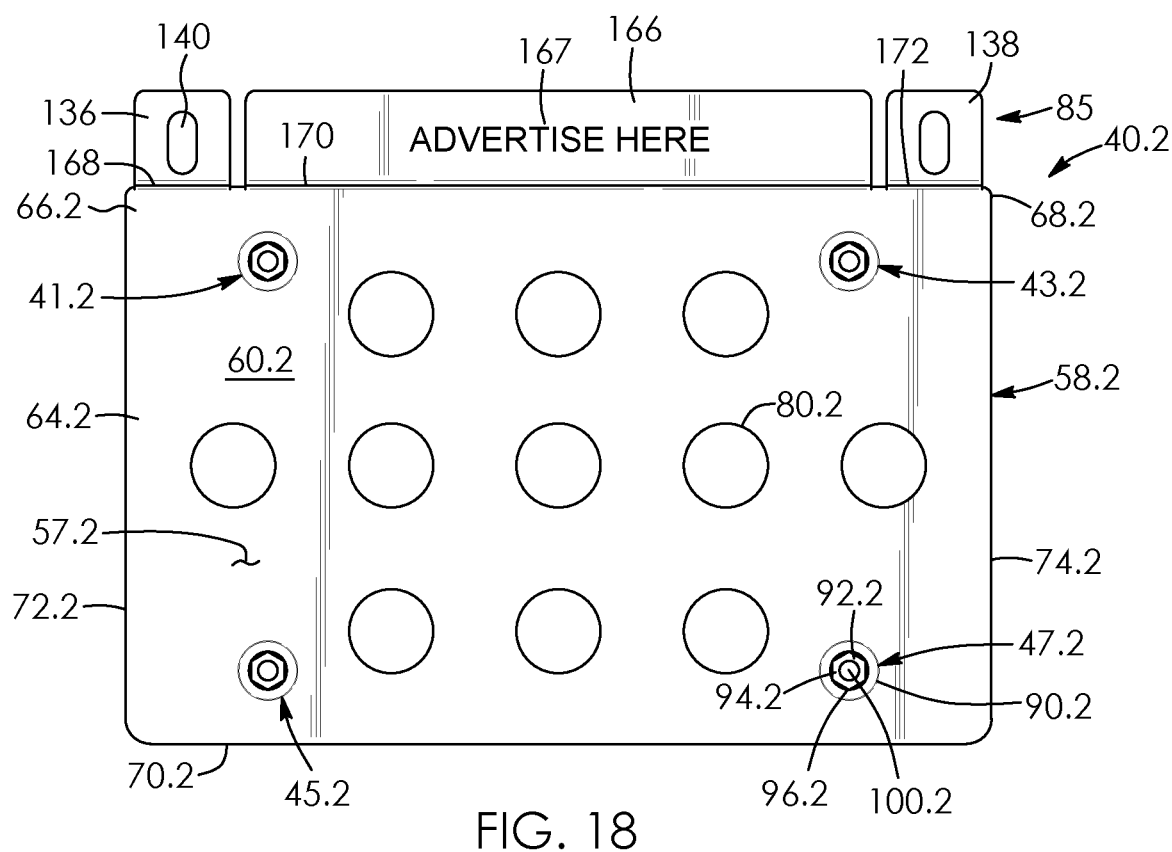
FIG. 18 is a front elevational view of an adapter plate assembly according to a second aspect.
Figure 19:
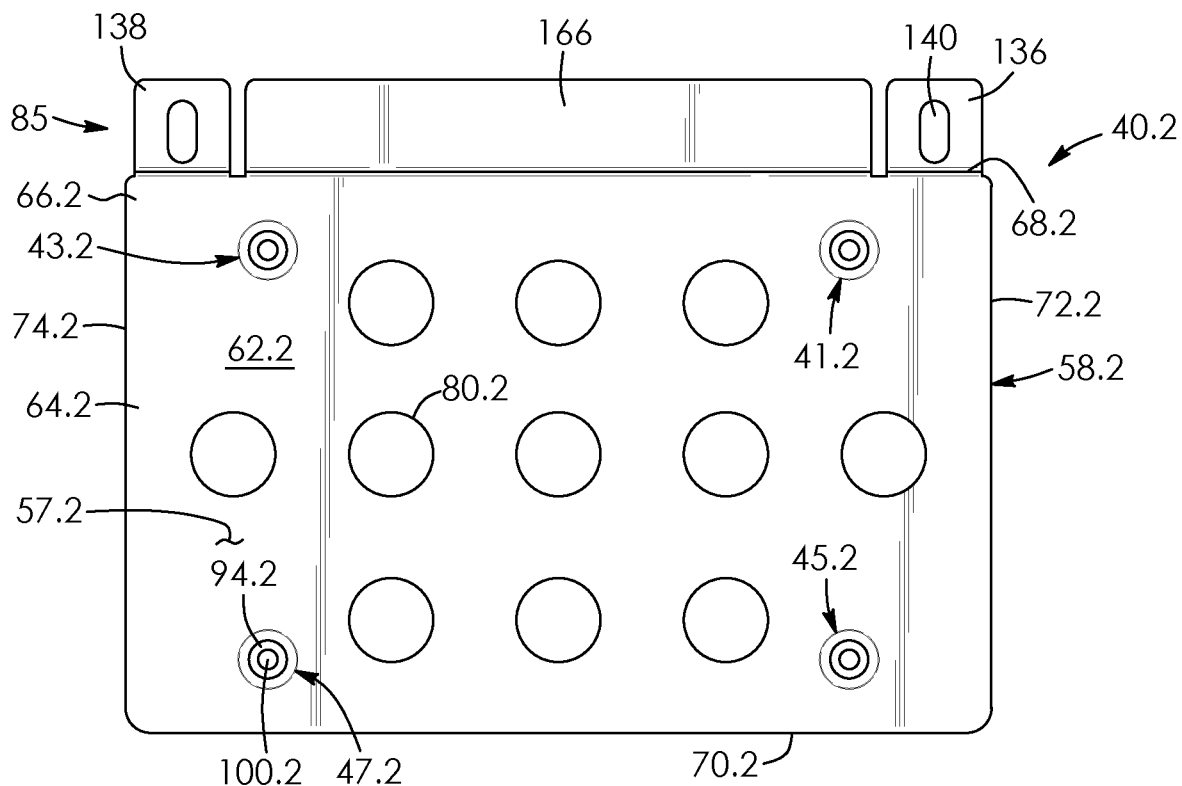
FIG. 19 is a rear elevational view thereof.
Figure 20:
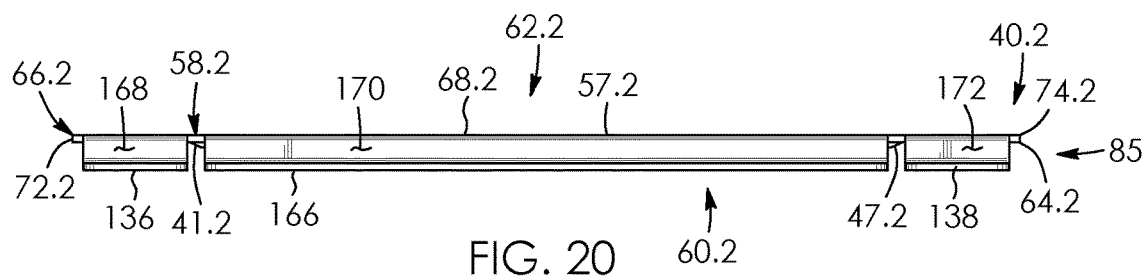
FIG. 20 is a top plan view thereof.
Figure 21:
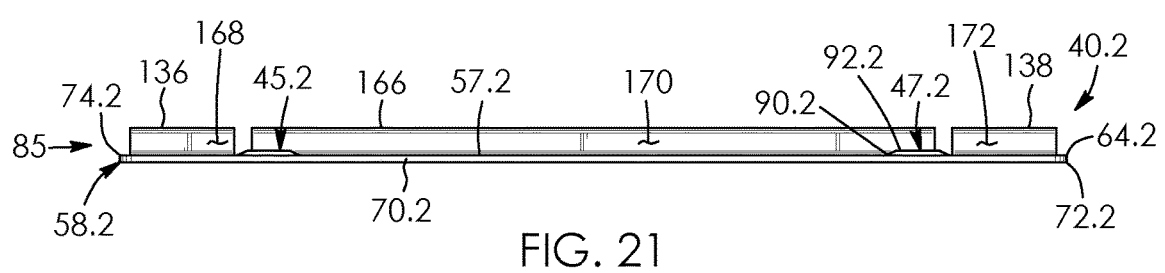
FIG. 21 is bottom plan view thereof.

As seen in FIG. 18, the adapter plate 58.2 has an upper peripheral portion 85 which couples to and extends upwards from the top 68.2 of the backing portion 57.2 of the adapter plate 58.2. The upper peripheral portion of the adapter plate extends between the sides 72.2 and 74.2 of the backing portion 57.2 of the adapter plate in this example. The upper peripheral portion 85 of the adapter plate includes a plurality of tabs, in this example in the form of a pair of spaced-apart connector tabs 136 and 138 and a display tab 166 extending between the connector tabs. Display tab is generally rectangular in shape and includes advertising indicia 167 thereon. As seen in FIG. 23, display tab 166 extends between connector tabs 136 and 138 and portions 131 and 133 of bracket 44.2 in this example. Referring back to FIG. 18, each of the connector tabs 136 and 138 is likewise rectangular in profile in this example. As seen in FIG. 20, the tabs 136, 138 and 166 are forwardly offset at least in part towards the front 60.2 of the adapter plate 58.2 relative to the backing portion 57.2 of the adapter plate 58.2.

Figure 22:
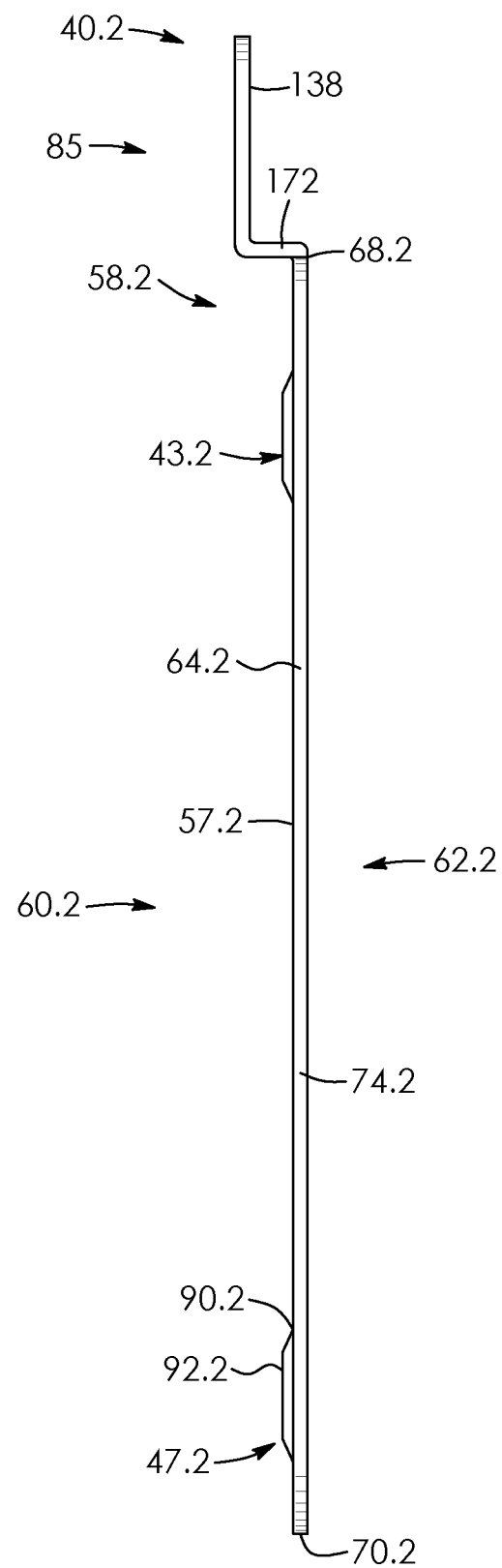
FIG. 22 is a right side view of the adapter plate assembly of FIG. 18, with the left side view being a mirror image thereof.

As seen in FIG. 20, the upper peripheral portion 85 of the adapter plate 58.2 includes a plurality of upper flanges 168, 170 and 172 that align adjacent to, couple to and extend along the top 68.2 of the backing portion 57.2 of the adapter plate. The flanges extend perpendicularly from backing portion 57.2 of the adapter plate towards the front 60.2 of the adapter plate in this example. The flanges couple to and extend between the backing portion 57.2 of the adapter plate and the tabs of the upper peripheral portion of the adapter plate. This is seen in FIG. 22 by flange 172 extending between top 68.2 of backing portion 57.2 of the adapter plate 58.2 and connector tab 138.

Referring to FIG. 18, each connector tab has a peripheral aperture, in this example a vertically-extending slotted aperture extending therethrough, as seen by aperture 140 for tab 136. The apertures 140 align with respective peripheral apertures 56.2 of the portions 131 and 133 of bracket 44.2. The adapter plate assembly 40.2 couples to the bracket via fasteners 87.2 which selectively extend through these apertures.

As seen in FIG. 23, connector tabs 136 and 138 and flanges 168 and 172 of the upper peripheral portion 85 of the adapter plate 58.2 form seats. Referring to FIG. 18, the upper peripheral portion 85 of the adapter plate 58.2 is L-shaped in cross-section in this example and enables the tabs 136 and 138 to be angled relative to the front 60.2 of the license plate 42.2 seen in FIG. 23. The connector tabs are configured to be selectively bendable so as to permit adjustment of the positioning of the front of the adapter plate 58.2 relative to the bracket 44.2.

FIGS. 24 to 31 show an adapter plate assembly 40.3 according to a third aspect. Like parts have like numbers and functions as the adapter plate assembly 40 shown in FIGS. 1 to 12 with the addition of decimal extension ".3". Adapter plate assembly 40.3 is substantially the same as adapter plate assembly 40 shown in FIGS. 1 to 12 with the following exceptions.

Each of the protrusions 41.3, 43.3, 45.3 and 47.3 is in the shape of a rectangular prism in this example.

Figure 31:
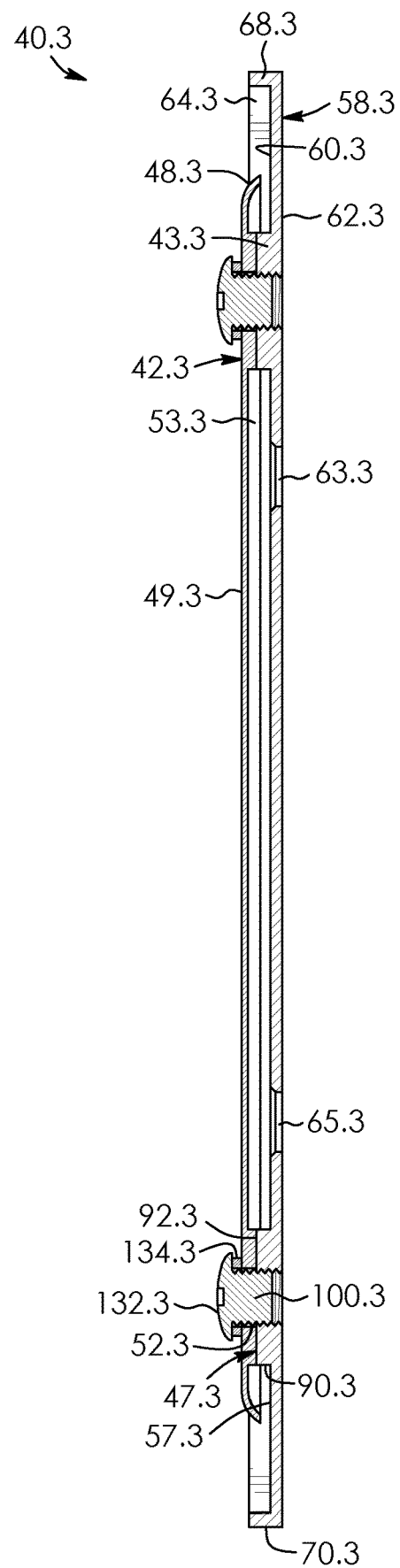
FIG. 31 is a side elevational, cross-sectional view of the adapter plate assembly of FIG. 24, together with a license plate connected thereto.

The adapter plate 58.3 has a recessed portion 142 which receives the license plate 42.3, as seen in FIG. 31. The recessed portion is defined by top 68.3, bottom 70.3, and sides 72.3 and 74.3 of the backing portion 57.3 of the adapter plate, each of which extends upwards from front 60.3 of the plate. The recessed portion 142 is sized to receive the license plate therewithin, as seen in FIG. 31. The peripheral region 64.3 of the adapter plate is thus coupled to and extends outwards from the front of the plate. The peripheral rim portion is shaped to extend around and partially enclose the license plate 42.3, as seen in FIG. 31.

The adapter plate 58.3, with its protrusions, in this example may be formed by milling out a recessed portion of the metal sheet.

Figure 29:
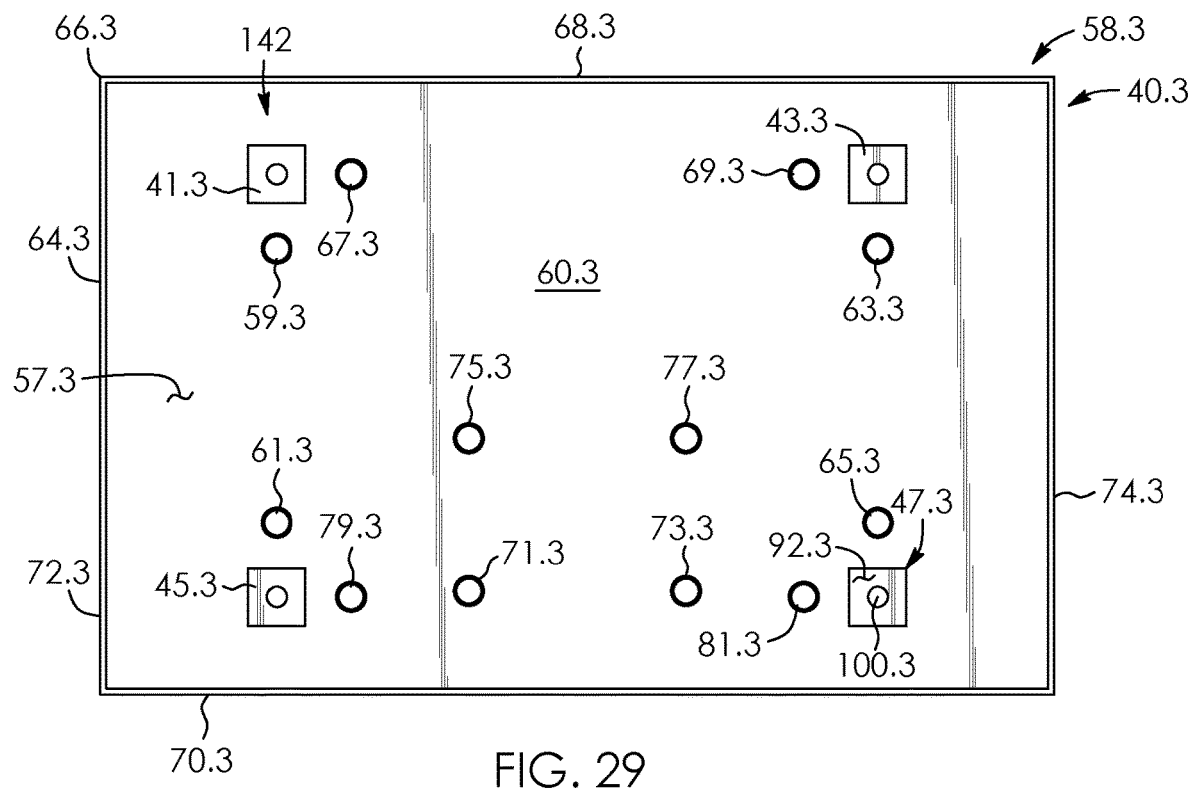
FIG. 29 is a front elevational view of the adapter plate assembly of FIG. 24.
Figure 30:
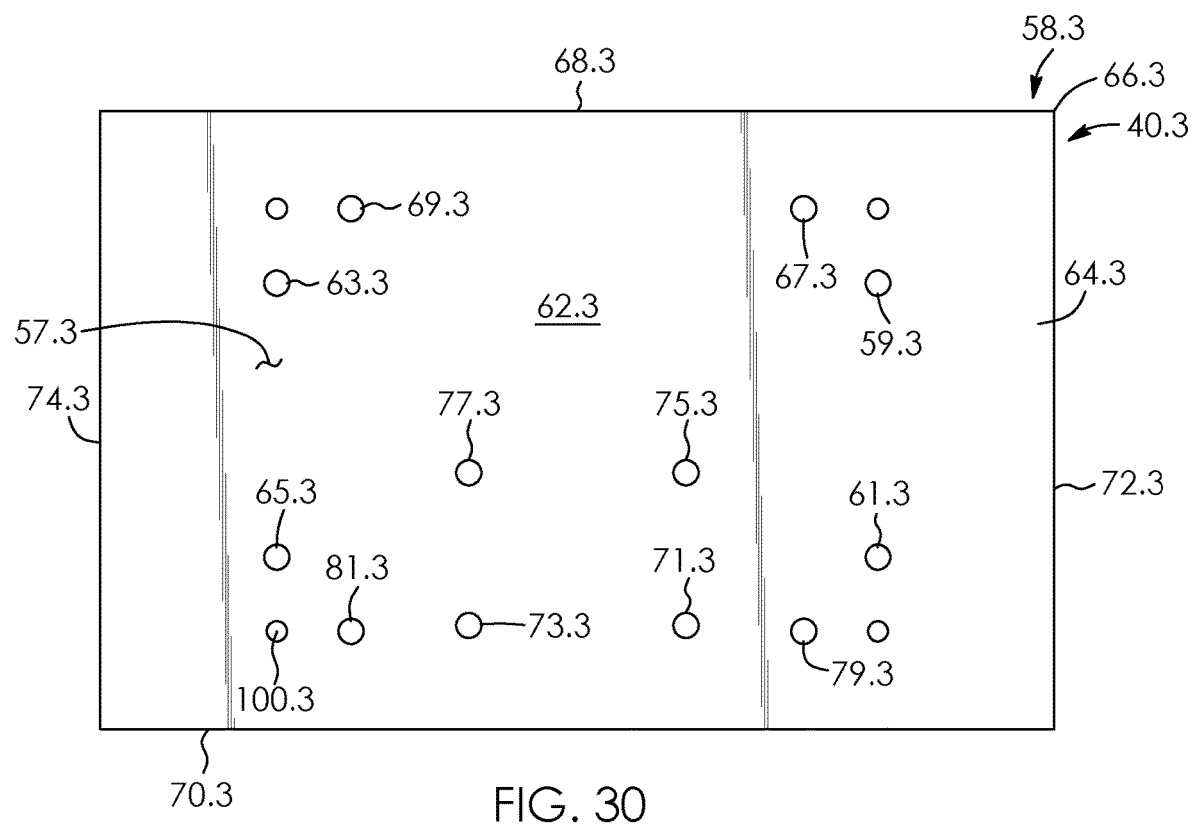
FIG. 30 is a rear elevational view thereof.

In this embodiment, apertures 71.3 and 73.3 substantially align with apertures 79.3 and 81.3, protrusions 45.3 and 47.3, and bottom 70.3 of the backing portion 57.3 of the plate 58.3, as seen in FIG. 29.

FIGS. 32 and 33 show an adapter plate assembly 40.4 according to a fourth aspect. Like parts have like numbers and functions as the adapter plate assembly 40.2 shown in FIGS. 18 to 23 with decimal extension ".4" replacing decimal extension ".2" and being added for like parts not previously having a decimal extension. Adapter plate assembly 40.4 is substantially the same as adapter plate assembly 40.2 shown in FIGS. 18 to 23 with the following exceptions.

Referring to FIG. 32, the assembly 40.4 may be particularly adapted for vehicles in the form of semi-trailers 46.4. However, this is not strictly required and assembly 40.4 may be used for other types of vehicles as well.

Referring to FIG. 32, the adapter plate assembly 40.4 includes an elongate protrusion, in this example flange 170.4 that couples to and extends perpendicular to the adapter plate 58.4. The flange has a pair of sides 173 and 175 that align with respective sides 72.4 and 74.4 of the backing portion 57.4 of the adapter plate 58.4. The flange 170.4 is shaped to enhance rigidity in the adapter plate.

As seen in FIG. 32, the upper peripheral portion of the adapter plate 58.4 is in this example a seat 85.4 formed by tab 166.4 and flange 170.4. The seat in this example is integrally connected to, formed with, and extends along the top 68.4 of the backing portion 57.4 of the adapter plate. Seat 85.4 has a pair of sides 169 and 171 that align with respective sides 72.4 and 74.4 of the backing portion of the adapter plate 58.4. As seen in FIG. 33, the seat 85.4 is L-shaped in cross-section in this example.

Assembly 40.4 further includes a resilient member 144. The resilient member is elastomeric in this example and in this case made of rubber. The resilient member 144 is substantially a rectangular prism in shape in this example. The resilient member has a first or lower portion 174 received by and coupled to the seat 85.4 of the adapter plate 58.4 as seen in FIG. 33. Still referring to FIG. 33, the lower portion of the resilient member 144 has a planar front 176 and a planar rear 178 opposite the planar front. The planar front of the lower portion 174 of the resilient member abuts, aligns with, and covers tab 166.4 in this example. In this example, the lower portion of the resilient member 144 is coextensive with tab 166.5. As seen in FIG. 33, the resilient member abuts the upper flange 170.4 of the seat 85.5 of the adapter plate 58.4 and couples to the adapter plate adjacent to said upper flange in this example.

The resilient member has a pair of spaced-apart outer apertures 146 and 148 extending through the lower portion 174 thereof. The apertures extend through the lower portion of the resilient member 144 from the front 176 to the rear 178 thereof seen in FIG. 33. The outer apertures are positioned adjacent to respective ones of the sides 153 and 155 of the resilient member 144. The outer apertures 146 and 148 of the lower portion 174 of the resilient member 144 align with the peripheral apertures 140.4 and 180 of the adapter plate 58.4. As seen in FIG. 33, license plate 42.4 couples to adapter plate 58.4 in a like manner as previously described.

As seen in FIG. 32, the resilient member 144 has a second or upper portion 182 which in this example is integrally formed and coupled to the lower portion 174 thereof. The lower and upper portions of the resilient member are generally rectangular in this example. The upper portion 182 of the resilient member 144 is connectable to a connector portion, in this example bracket 44.4 of trailer 46.4 as seen in FIG. 33. The upper portion of the resilient member extends upwards from the seat 85.4 of the adapter plate 58.4.

The resilient member 144 has a second pair of spaced-apart inner apertures 157 and 159 extending through the upper portion thereof. Apertures 157 and 159 which are inwardly spaced from sides 153 and 155 thereof, respectively. The inner apertures of the upper portion 182 of the resilient member are also inwardly spaced from outer apertures 146 and 148 of the lower portion 174 of the resilient member 144. The inner apertures 157 and 159 of the upper portion 182 of the resilient member are positioned to align with peripheral apertures 56.4 and 184 of bracket 44.4 seen in FIG. 32.

As seen in FIG. 32, the assembly includes a plurality of connectors, in this example rivets, in this case crush rivets 149 and 151; however, this is not strictly required and other connectors may be used in other embodiments. Rivet 149 extends through aperture 140.4 of tab 166.4 and aperture 146 of the lower portion 174 of the resilient member 144. Rivet 151 extends through aperture 180 of the tab and aperture 148 of the lower portion of the resilient member. The rivets are crushed thereafter to couple the adapter plate 58.4 and lower portion of the resilient member together thereby.

Referring to FIG. 32, the assembly includes a further plurality of connectors, in this example bolts 87.4 and 186 and corresponding nuts threadably connectable thereto. This is seen by nut 161 in FIG. 33 coupled to bolt 186. A corresponding washer 163 is interposed between its respective nut 161 and the bracket 44.4 in this example. However, this form of connectors and coupling is not strictly required and other connectors may be used in other embodiments.

As seen in FIG. 32, bolt 87.4 extends through aperture 157 of the upper portion 182 of the resilient member 144 and aperture 56.4 of the bracket 44.4 of the trailer 46.4. Bolt 186 extends through aperture 159 of the upper portion of the resilient member and aperture 184 of the bracket of the trailer. As seen in FIG. 33, nuts 161 couple with to the threaded ends 188 of the bolts 186 thereafter. The nuts abut washers 163 in this example which in turn abut the rear 165 of bracket 44.4 for coupling the resilient member 144, and thus adapter plate 58.4 and license plate 42.2, to the bracket 44.4 thereby. As seen in FIG. 33, the resilient member is thus interposed between the display tab 166.4 of the adapter plate 58.4 and the bracket 44.4 of the trailer 46.4 in this example. The backing portion 57.4 of the adapter plate is shaped to align with the vertically-extending portion 190 of bracket of the vehicle in this embodiment. The resilient member 144 so configured may enable the license plate 42.4 seen in FIG. 33 to flex and selectively move slightly forward and rearward.

FIGS. 34 and 35 show an adapter plate assembly 40.5 according to a fifth aspect. Like parts have like numbers and functions as the adapter plate assembly 40.4 shown in FIGS. 32 and 33 with decimal extension ".5" replacing decimal extension ".4" and being added for like parts not previously having a decimal extension. Adapter plate assembly 40.5 is substantially the same as adapter plate assembly 40.4 shown in FIGS. 32 and 33 with the following exceptions.

As seen in FIG. 34, the seat 85.5 of the adapter plate 58.5 includes a central aperture 192 extending therethrough. Aperture 192 is positioned between apertures 140.5 and 180.5 in this example. Each of the apertures 140.5, 180.5 and 192 is square in shape in this example. The apertures are shaped to receive a plurality of connectors which in this example in the form of carriage bolts 149.5, 151.5 and 194; however, this is not strictly required and other types of connectors may be used in other examples.

The lower portion 174.5 of the resilient member 144.5 includes an additional central aperture 196 extending therethrough. Aperture 196 is positioned between apertures 146.5 and 148.5 in this example and aligns with aperture 192 of the seat 85.5 of the adapter plate 85.5.

As seen in FIG. 34, the upper portion 182.5 of the resilient member 144.5 is inwardly spaced relative to the lower portion 174.5 of the resilient member in this example and is inwardly spaced from the sides 72.5 and 74.5 of the backing portion 57.5 of the adapter plate 58.5. The resilient member has spaced-apart planar regions 198 and 200 adjacent to sides 153.5 and 155.5 thereof. The planar regions are L-shaped in front and rear profile in this example, with each comprising parts of the lower and upper portions of the resilient member. Apertures 146.5 and 157.5 extend through planar region 198 and apertures 148.5 and 159.5 extend through planar region 200 in this example. The upper portion 182.5 of the resilient member 144.5 is U-shaped in front and rear profile in this example with an upper recessed region 202 between the planar regions 198 and 200 of the resilient member.

Assembly 40.5 includes an elongate backing member, in this example a backing plate 204. However, this is not strictly required, and the backing member may be other shapes in other examples. The backing plate 204 is made of metal sheet and is substantially rectangular in shape in this example. Likewise, this is not strictly required and the backing plate may be made of non-metal materials in other examples. The backing plate 204 is shaped to substantially align with and cover the second side 178.5 of the lower portion 174.5 of the resilient member 144.5 seen in FIG. 35 in this example. As seen in FIG. 35, the seat 85.5 of the adapter plate 58.5 and the backing plate 204 are shaped to thus form a receptacle within which the lower portion 174.5 of the resilient member 144.5 is received.

The backing plate 204 has a plurality of spaced-apart apertures extending therethrough, in this example in the form of apertures 206, 208 and 210. Apertures 206, 208, and 210 of the back plate align with apertures 140.5, 192, and 180.5, respectively, of the seat 85.5 of the adapter plate 58.5 and align with apertures 146.5, 196, and 148.5 of the resilient member 144.5, respectively. In this manner, bolts 149.5, 194, and 151.5 may extend therethrough and couple the adapter plate 58.5, resilient member 144.5 and backing plate 204 together via nuts as shown by nut 193 in FIG. 35 for bolt 151.5. As seen in FIG. 35, the backing plate so coupled together aligns and extends substantially in parallel with the backing portion 57.5 of the adapter plate in this example.

Figure 37:
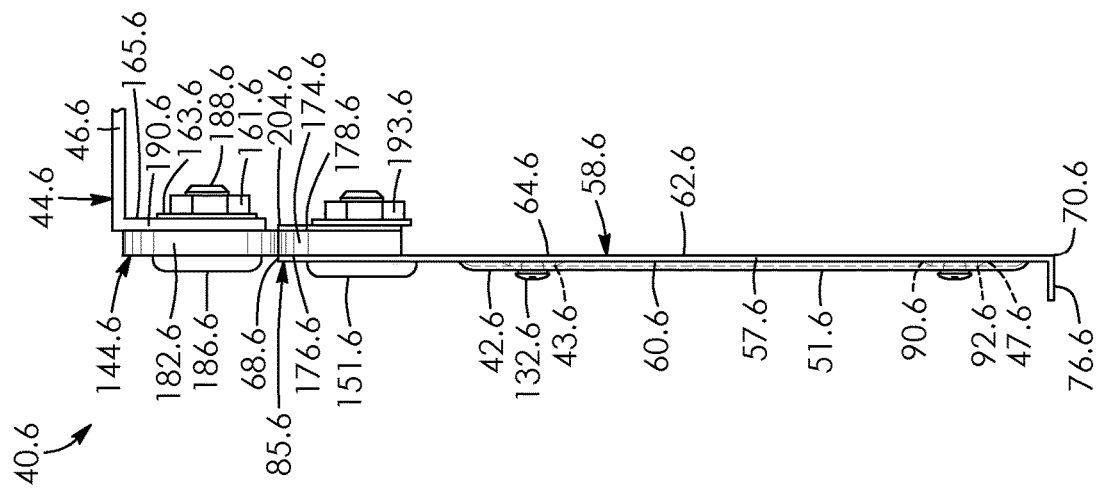
FIG. 37 is a right side elevational view of the adapter plate assembly of FIG. 36 coupled to a license plate and a bracket for a rear portion of a trailer, the bracket being similar to that shown in FIG. 32 and being shown in fragment.
Figure 36:
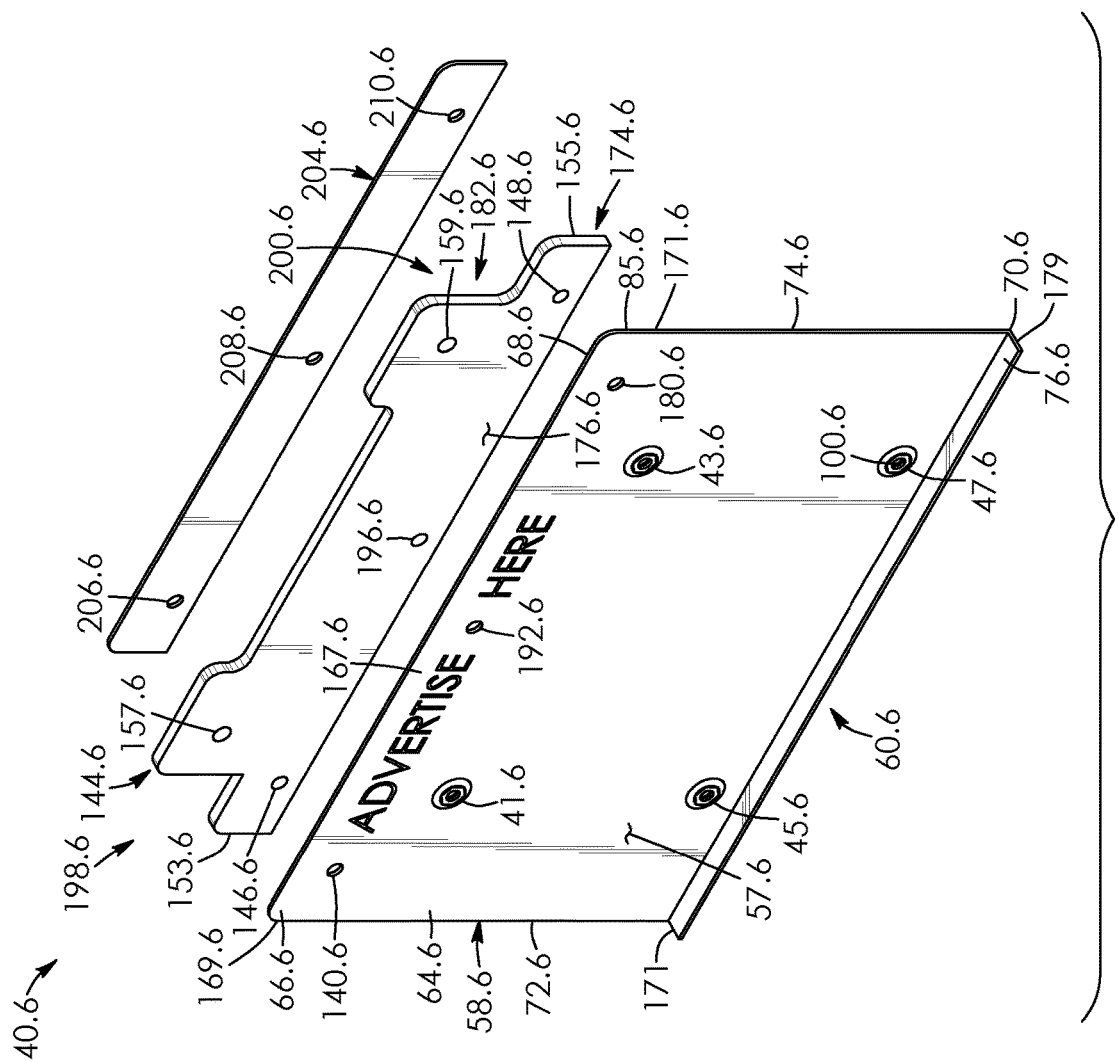
FIG. 36 is an exploded, rear, top perspective view of an adapter plate assembly according to a sixth aspect.

FIGS. 36 and 37 show an adapter plate assembly 40.6 according to a sixth aspect. Like parts have like numbers and functions as the adapter plate assembly 40.5 shown in FIGS. 34 and 35 with decimal extension ".6" replacing decimal extension ".5" and being added for like parts not previously having a decimal extension. Adapter plate assembly 40.6 is substantially the same as adapter plate assembly 40.4 shown in FIGS. 34 and 35 with the following exceptions.

In this example, adapter plate 58.6 terminates at the top 68.6 of the backing portion 57.6 thereof and has no upper peripheral portion coupling to and extending from said backing portion. Apertures 140.6, 192.6 and 180.6 extend through the backing portion 57.6 of the adapter plate. The front 176.6 of the lower portion 174.6 of the resilient member 144.6 couples directly to the backing portion of the adapter plate 58.6 at the rear 62.6 of the adapter plate as seen in FIG. 37. A seat such as seat 85.5 shown in FIG. 34 for assembly 40.5 is thus not provided nor required for assembly 40.6 shown in FIGS. 36 and 37.

The adapter plate 58.6 includes a lower peripheral portion or elongate protrusion in this example in the form of a lower flange 181. Referring to FIG. 36, the lower flange has a pair of sides 177 and 179 that align with respective sides 72.6 and 74.6 of the backing portion 57.6 of the adapter plate 58.6. The lower flange 181 couples to, extends along and extends outwards from the bottom 70.6 of the backing portion 57.6 of the adapter plate in the direction of the front 60.6 of the adapter plate. The flange extends between sides 72.6 and 74.6 of the backing portion 57.6 of the adapter plate 58.6. The flange 181 is generally rectangular in shape in this example and is positioned substantially perpendicular to the backing portion 57.6 of the adapter plate 58.6 in this example.

Figure 39:
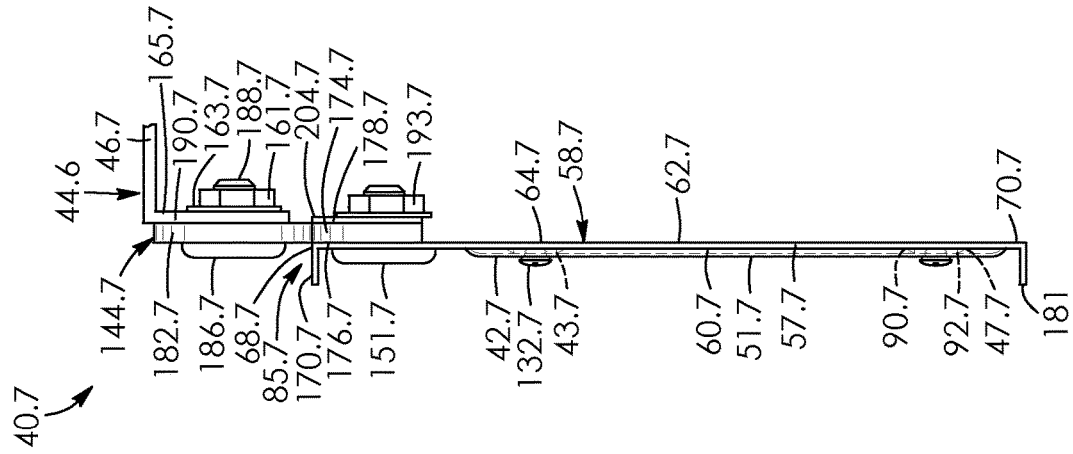
FIG. 39 is a right side elevational view of the adapter plate assembly of FIG. 38 coupled to a license plate and a bracket for a rear portion of a trailer, the bracket being similar to that shown in FIG. 32 and being shown in fragment.
Figure 38:
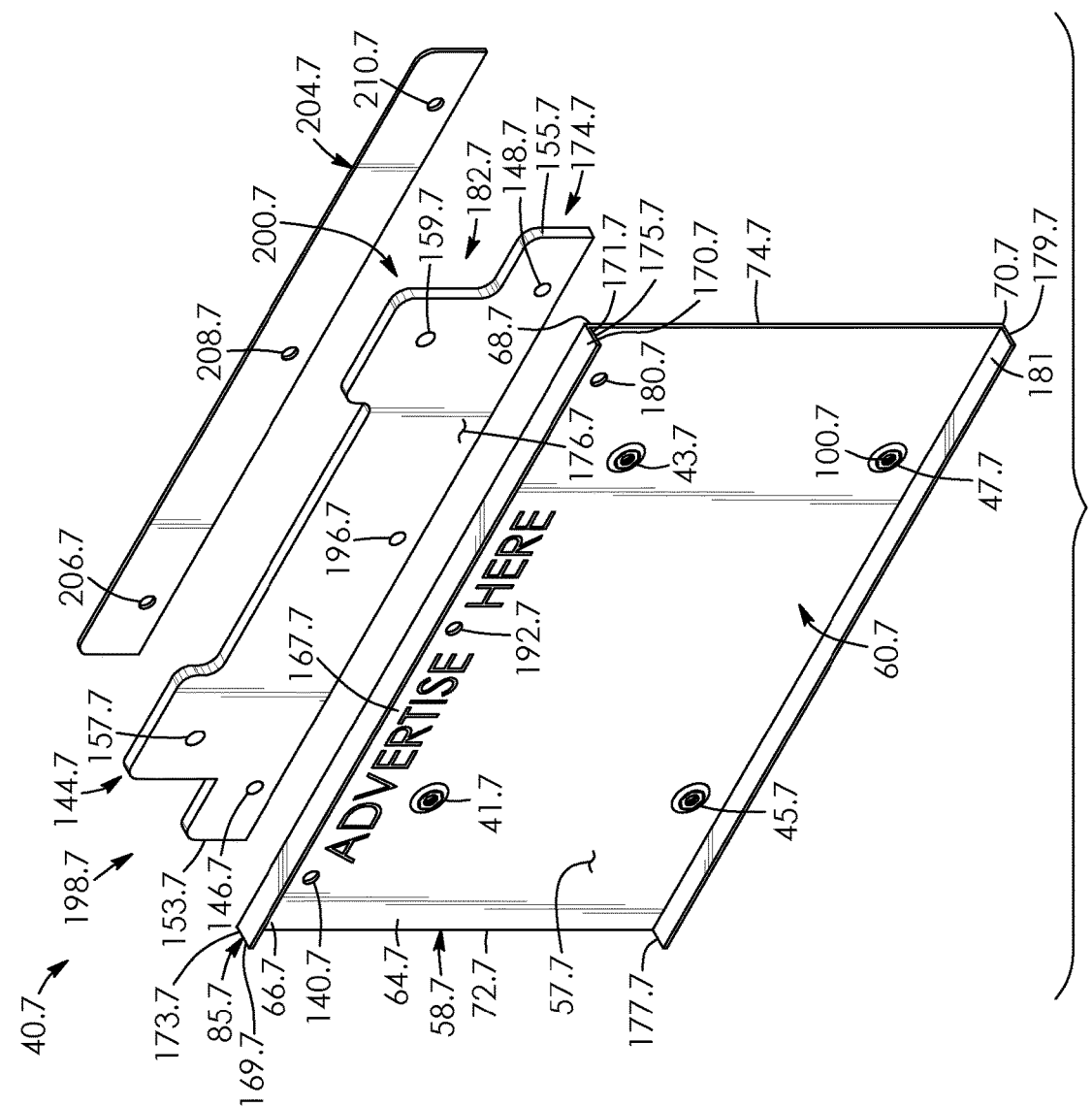
FIG. 38 is an exploded rear, top perspective of an adapter plate assembly according to a seventh aspect.

FIGS. 38 and 39 show an adapter plate assembly 40.7 according to a seventh aspect. Like parts have like numbers and functions as the adapter plate assembly 40.6 shown in FIGS. 36 and 37 with decimal extension ".7" replacing decimal extension ".6" and being added for like parts not previously having a decimal extension. Adapter plate assembly 40.7 is substantially the same as adapter plate assembly 40.4 shown in FIGS. 34 and 35 with the following exceptions.

The adapter plate 58.7 includes an upper peripheral portion 85.7 which in this example comprises only upper flange 170.7. The upper flange couples to and extends outwards from the top 68.7 of the backing portion 57.7 of the adapter plate in the direction of the front 60.7 of the adapter plate in this example. Flange 170.7 extends between sides 72.7 and 74.7 of the backing portion of the adapter plate in this example. The flange is generally rectangular in shape in this example and is positioned substantially perpendicular to the backing portion 57.6 of the adapter plate 58.6 in this example. As seen in FIG. 38, flange 170.7 is positioned between the lower portion 174.7 and the upper portion 182.7 of the resilient member 144.7 in this example.

Referring to FIG. 38, license plate 42.7 so coupled to the backing portion 57.7 of the adapter plate 58.7 is between flanges 181 and 170.7 in this example.

FIGS. 40 and 41 show an adapter plate assembly 40.8 according to an eighth aspect. Like parts have like numbers and functions as the adapter plate assembly 40.5 shown in FIGS. 34 and 35 with decimal extension ".8" replacing decimal extension ".5" and being added for like parts not previously having a decimal extension. Adapter plate assembly 40.8 is substantially the same as adapter plate assembly 40.5 shown in FIGS. 34 and 35 with the following exceptions.

Adapter plate 58.8 includes an upper peripheral portion in the form of a receptacle 85.8. The receptacle is U-shaped in cross-section in this example. The receptacle comprises a pair of spaced-apart planar members, in this example in the form of display tab 166.8 and backing plate 204.8, and flange 170.8 coupling the tab and backing plate together. The display tab and backing plate extend in parallel with each other in this example. The backing plate 204.8 is thus integrally connected to and formed with the flange 170.8 and tab 166.8 in this embodiment.

Display tab 166.8 is coupled to, is integrally formed with, extends upwards from and extends along the top 68.8 of the backing portion 57.8 of the adapter plate 58.8 in this example. In this example, the display tab aligns with and extends in parallel with the backing portion 57.8 of the adapter plate 58.8. As seen in FIG. 40, flange 170.8 in this example extends outwards from the backing portion 57.8 of the adapter plate 58.8 towards the rear 62.8 of the adapter plate.

The lower portion 174.8 of the resilient member 144.8 is received within and couples to the receptacle 85.8 via connectors, in this example bolts 151.8 and corresponding nuts 193.8.

Figure 44:
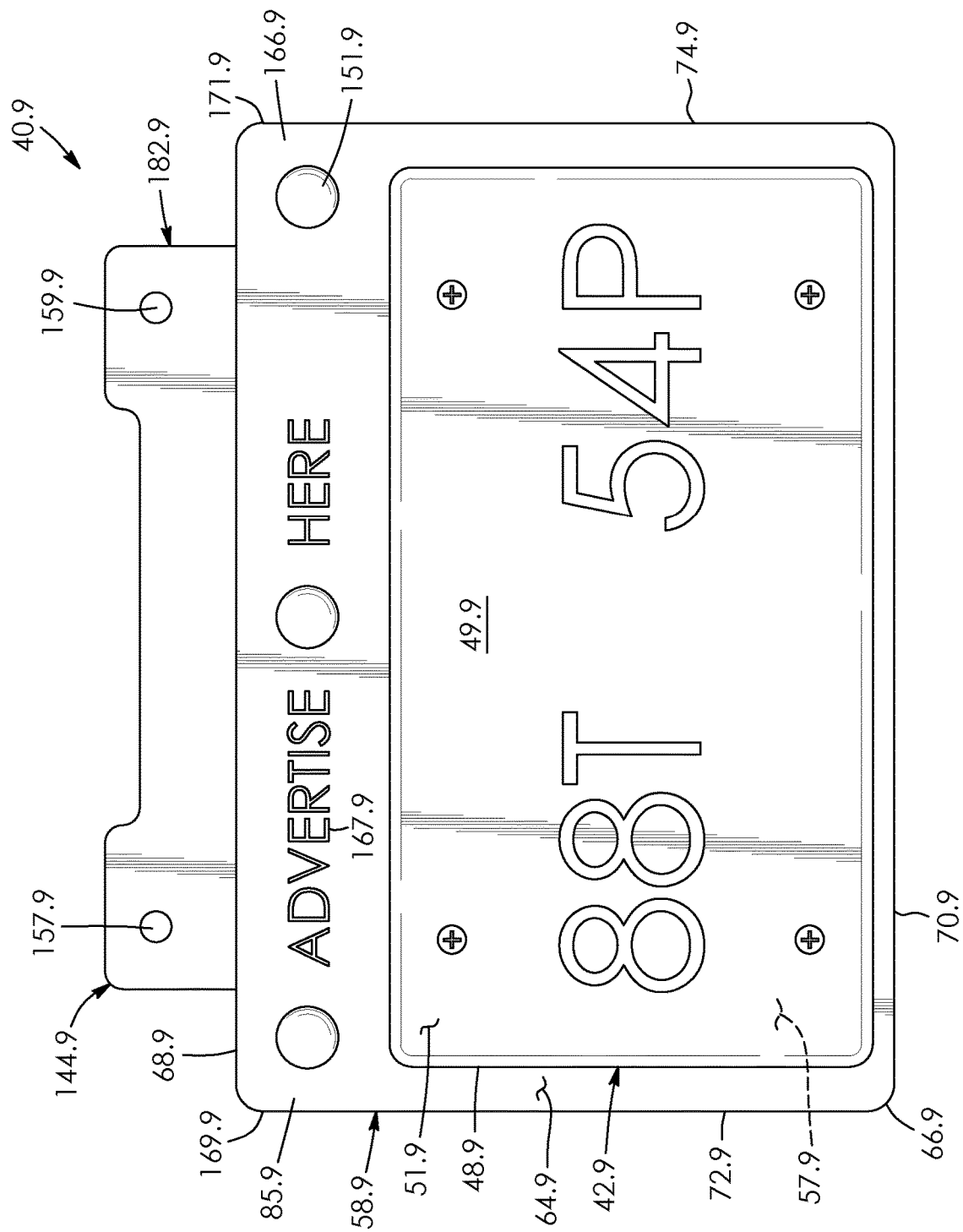
FIG. 44 is a front elevational view of the license plate and adapter plate assembly of FIG. 43, with the bracket of the rear portion of the trailer not being shown.

FIGS. 42 to 44 show an adapter plate assembly 40.9 according to a ninth aspect. Like parts have like numbers and functions as the adapter plate assembly 40.5 shown in FIGS. 34 and 35 with decimal extension ".9" replacing decimal extension ".5" and being added for like parts not previously having a decimal extension. Adapter plate assembly 40.9 is substantially the same as adapter plate assembly 40.5 shown in FIGS. 34 and 35 with the following exceptions.

Referring to FIG. 42, in this embodiment the adapter plate 58.9 is substantially in the shape of a rectangular plate, with rounded corners 66.9 in this example. The upper peripheral portion 85.9 of adapter plate 58.9 comprises a rectangular strip that is co-planar with, integrally formed with and integrally connected to the backing portion 57.9 of the adapter plate.

The lower portion 174.9 of the resilient member 144.9 couples to and is interposed between the upper peripheral portion 85.9 of the adapter plate and backing plate 204.9 via a plurality of connectors in the form of carriage bolts 151.9 which extend through apertures 180.9, 148.9 and 210.9, with nuts 193.9 threadably coupling to the carriage bolts. As seen in FIG. 44, the peripheral region 64.9 of the backing portion 57.9 of the adapter plate 58.9 aligns with, extends outwards relative to the peripheral rim portion 48.9 of the license plate 42.9 and extends around the peripheral rim portion. The adapter plates so shaped is configured to absorb, at least in part, impact from collisions with rocks, tree stumps and the like, and the adapter plate thereby functions to inhibit the license plate 42.9 from being damaged from the same.

Adapter plate assembly 40.9 thus comprises an improved and more robust means of mounting a license plate to a vehicle in a cost-effective manner.

Figure 45:
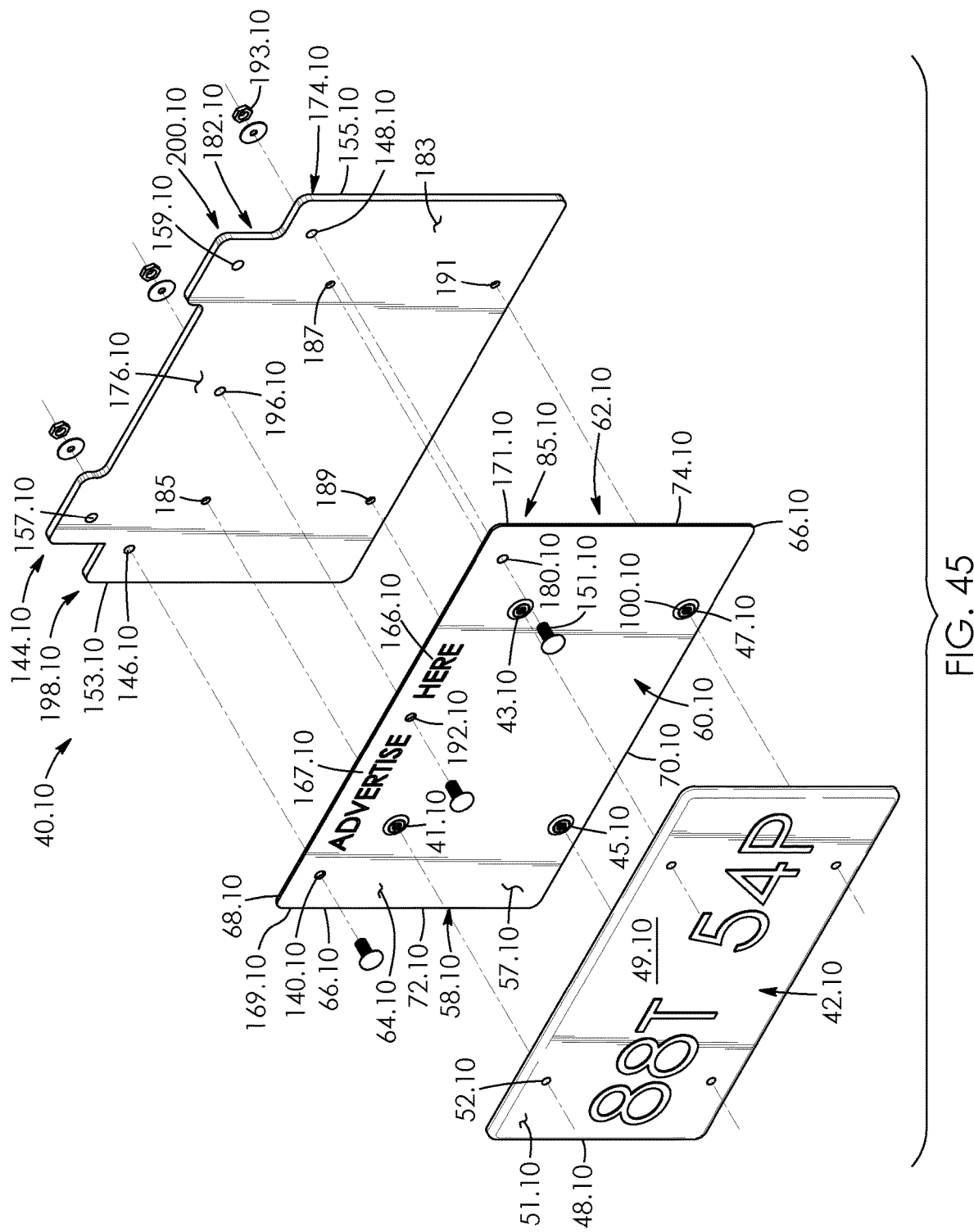
FIG. 45 is an exploded, rear, top perspective of a license plate and an adapter plate assembly according to a tenth aspect.

FIGS. 45 to 47 show an adapter plate assembly 40.10 according to a tenth aspect. Like parts have like numbers and functions as the adapter plate assembly 40.9 shown in FIGS. 42 to 44 with decimal extension ".10" replacing decimal extension ".9" and being added for like parts not previously having a decimal extension. Adapter plate assembly 40.10 is substantially the same as adapter plate assembly 40.9 shown in FIGS. 42 to 44 with the following exceptions.

As seen in FIG. 45, in this embodiment the lower portion 174.10 of resilient member 144.10 is rectangular in shape and has a planar area 183 equal to or greater than the backing portion 57.10 of adapter plate 58.10. In this example, the lower portion of the resilient member is coextensive with the backing portion of the adapter plate.

The lower portion 174.10 of the resilient member 144.10 has a plurality of spaced-apart apertures 185, 187, 189 and 191 extending therethrough and which align with protrusions 41.10, 43.10, 45.10 and 47.10. The backing portion 57.10 of the adapter plate 58.10 couples to and is interposed between the license plate 42.10 and the lower portion of the resilient member via a plurality of fasteners, in this example bolts 132.10, seen in FIG. 46. Referring to FIG. 45, the bolts extend through apertures 52.10, protrusions 43.10 and apertures 187, with nuts 193 threadably coupling to the bolts thereafter.

Figure 48:
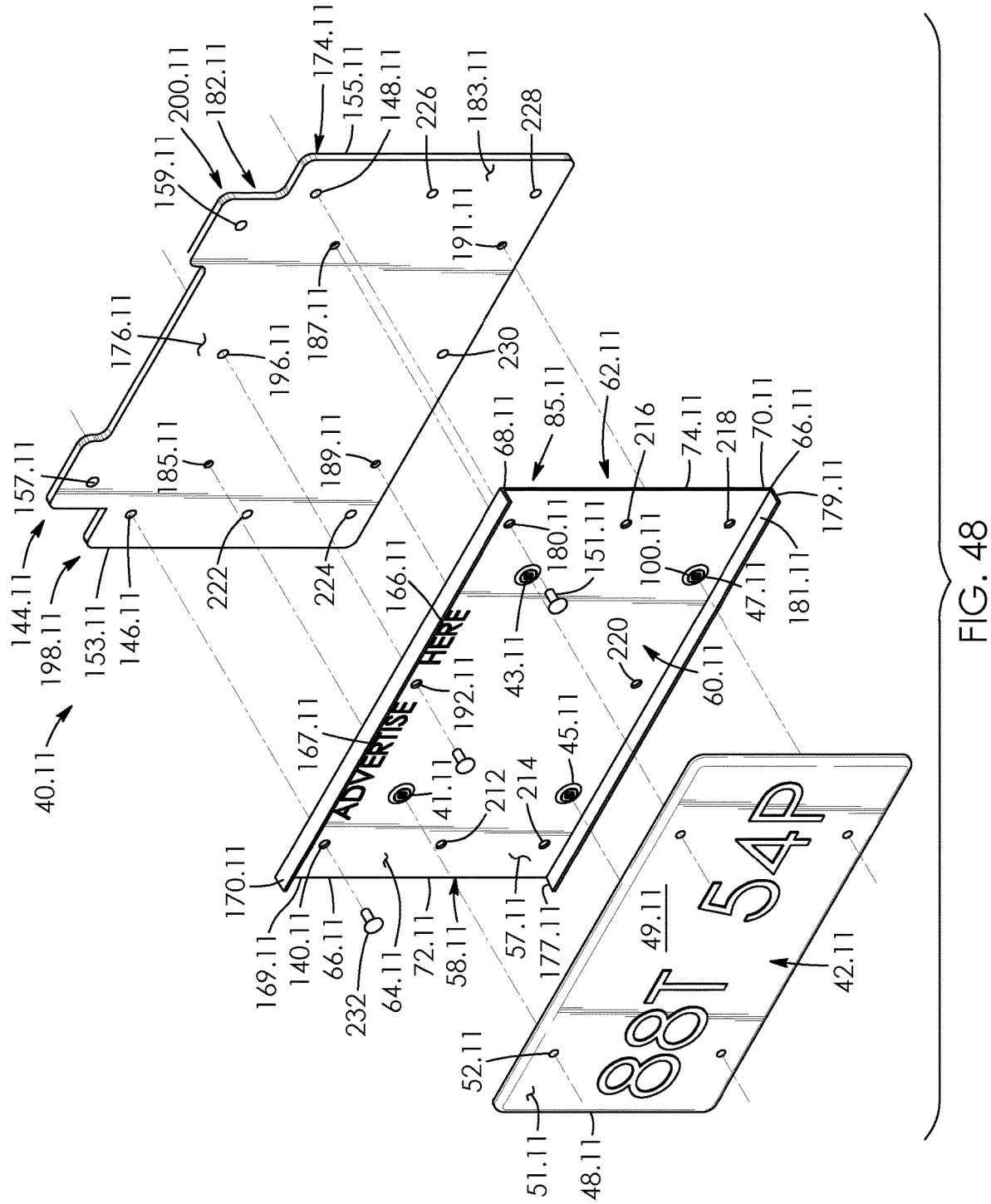
FIG. 48 is an exploded, rear, top perspective of a license plate and an adapter plate assembly according to an eleventh aspect.

FIGS. 48 to 50 show an adapter plate assembly 40.11 according to an eleventh aspect. Like parts have like numbers and functions as the adapter plate assembly 40.10 shown in FIGS. 45 to 47 with decimal extension ".11" replacing decimal extension ".10". Adapter plate assembly 40.11 is substantially the same as adapter plate assembly 40.10 shown in FIGS. 45 to 47 with the following exceptions.

The adapter plate 58.11 is substantially the same as adapter plate 58.7 shown in FIGS. 38 to 39, with decimal extension ".11" replacing decimal extension ".7" and being added for like parts not previously having a decimal extension. The adapter plate has a plurality of spaced-apart apertures 140.11, 192.11, 180.11, 212, 214, 216, 218 and 220 extending therethrough. Apertures 140.11, 212 and 214 align with each other, apertures 192.11 and 220 align with each other, and apertures 180.11, 216 and 218 align with each other in this example.

Resilient member 144.11 has a plurality of apertures 146.11, 196.11, 148.11, 222, 224, 226, 228 and 230 which align with apertures 140.11, 192.11, 180.11, 212, 214, 216, 218 and 220, respectively, of the adapter plate 58.11. The adapter plate couples to the resilient member via a plurality of fasteners in this example in the form of rivets 151.11 and 232 which extend through said aligned apertures of the resilient member and adapter plate.

It will be appreciated that many variations are possible within the scope of the invention described herein. It will also be understood by someone skilled in the art that many of the details provided above are by way of example only and are not intended to limit the scope of the invention which is to be determined with reference to at least the following claims.

What is claimed is:

1. An adapter plate assembly for mounting a license plate to a vehicle, the license plate having a rear and a plurality of apertures, and the assembly comprising:
    an adapter plate having a front, a rear, and a plurality of apertures that align with the apertures of the license plate, the adapter plate including a backing portion shaped to couple with and inhibit bending of the license plate, the rear of the license plate coupling to the backing portion of the adapter plate at the front of the adapter plate, and the adapter plate including upper and lower flanges, the flanges being integral with the adapter plate and being formed from folding the adapter plate; and
    a resilient member having a lower portion connectable with the adapter plate, the lower portion of the resilient member coupling to the backing portion of the adapter plate at the rear of the adapter plate, the resilient member having an upper portion for coupling to the vehicle, the upper portion of the resilient member having a pair of spaced-apart apertures which are in alignment with respective said apertures of the adapter plate, and the resilient member being configured to enable the license plate to move slightly forward and rearward.

2. The assembly as claimed in claim 1, the license plate having a front defining a planar area, and wherein the backing portion is shaped to span the planar area of the license plate.

3. The assembly as claimed in claim 1 wherein the backing portion of the adapter plate is rectangular.

4. The assembly as claimed in claim 1, wherein the backing portion of the adapter plate has a top, a bottom, and a pair of opposite sides which extend between the top and the bottom thereof, and wherein the each said flange has a pair of sides which align with respective said sides of the backing portion of the adapter plate.

5. The assembly as claimed in claim 1 wherein each said flange is shaped to enhance rigidity in the adapter plate.

6. The assembly as claimed in claim 1, the license plate having a peripheral edge portion, and wherein the adapter plate includes a peripheral edge portion that aligns with and extends outwards relative to the peripheral edge portion of the license plate.

7. The assembly as claimed in claim 1, wherein the lower portion of the resilient member is coextensive with the backing portion of the adapter plate.

8. The assembly as claimed in claim 1, wherein the lower portion of the resilient member has a planar area equal to or greater than that of the backing portion of the adapter plate.

9. The assembly as claimed in claim 1 wherein the adapter plate has a pair of spaced-apart sides and wherein the upper portion of the resilient member is inwardly spaced-apart from said sides of the adapter plate.

10. The assembly as claimed in claim 1 wherein the resilient member is an elastomer.

11. The assembly as claimed in claim 1 wherein the resilient member is made of rubber and wherein the adapter plate is made of sheet metal.

12. The adapter plate assembly as claimed in claim 1, the rear of the license plate being recessed, and wherein the adapter plate includes a plurality of spaced-apart protrusions configured to abut and support the recessed rear of the license plate.

13. The assembly as claimed in claim 12, wherein each of the protrusions is frustoconical in shape.

14. The assembly as claimed in claim 12, wherein the apertures of the adapter plate at least partially extend through respective said protrusions, and wherein the assembly further includes a plurality of fasteners configured to extend through respective ones of the apertures of the license plate and the adapter plate, the license plate coupling to the adapter plate thereby.

15. The assembly as claimed in claim 1, wherein the upper flange extends along a top of the backing portion of the adapter plate, and wherein the lower flange extends along a bottom of the backing portion of the adapter plate.

16. The assembly as claimed in claim 1, further including fasteners which extend through the apertures of the upper portion of the resilient member for coupling the upper portion of the resilient member to the vehicle.

17. The assembly as claimed in claim 1, wherein the upper portion of the resilient member has a first planar region that aligns with a first said aperture of the backing portion of the adapter plate and a second planar region that aligns with a second said aperture of the backing portion of the adapter plate.

18. The assembly as claimed in claim 17 wherein the resilient member couples to the vehicle via said first planar region and said second planar region.

19. The assembly as claimed in claim 1 wherein the assembly is configured to enable the adapter plate to freely swing forwards and rearwards relative to the upper portion of the resilient member.

20. The assembly as claimed in claim 1 wherein each said flange extends perpendicular to the backing portion of the adapter plate.

\* \* \* \* \*